(12) United States Patent
Kissa et al.

(10) Patent No.: US 10,295,844 B2
(45) Date of Patent: May 21, 2019

(54) ELECTRODE STRUCTURES FOR OPTICAL MODULATORS

(71) Applicant: Lumentum Operations LLC, Milpitas, CA (US)

(72) Inventors: Karl Kissa, Gilroy, CA (US); David Glassner, Ellington, CT (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/090,986

(22) Filed: Apr. 5, 2016

(65) Prior Publication Data

US 2016/0291352 A1    Oct. 6, 2016

Related U.S. Application Data

(60) Provisional application No. 62/143,961, filed on Apr. 7, 2015, provisional application No. 62/143,427, filed on Apr. 6, 2015.

(51) Int. Cl.
| | |
|---|---|
| *G02F 1/035* | (2006.01) |
| *G02F 1/01* | (2006.01) |
| *G02F 1/03* | (2006.01) |
| *G02F 1/225* | (2006.01) |

(52) U.S. Cl.
CPC .......... *G02F 1/0102* (2013.01); *G02F 1/0316* (2013.01); *G02F 1/0356* (2013.01); *G02F 1/2255* (2013.01)

(58) Field of Classification Search
CPC .............................. G02F 1/0316; G02F 1/0356
See application file for complete search history.

(56) References Cited

U.S. PATENT DOCUMENTS

| | | | |
|---|---|---|---|
| 5,129,017 A * | 7/1992 | Kawano | G02F 1/0356 |
| | | | 385/2 |
| 5,138,480 A | 8/1992 | Dolfi et al. | |
| 5,404,412 A | 4/1995 | Seino et al. | |
| 5,455,876 A | 10/1995 | Hopfer et al. | |
| 5,473,711 A | 12/1995 | Hakogi et al. | |
| 5,497,445 A | 3/1996 | Imoto | |
| 5,502,780 A | 3/1996 | Rangaraj | |

(Continued)

OTHER PUBLICATIONS

Miyamoto et al., "Design of high efficiency LiNbO3 broadband phase modulator using an electrode buried in buffer layer," Electronics Letters, Jan. 30, 1992, vol. 28, No. 3, pp. 322-324.

(Continued)

*Primary Examiner* — Chris H Chu
(74) *Attorney, Agent, or Firm* — Harrity & Harrity, LLP

(57) ABSTRACT

A device may include a substrate. The device may include an optical waveguide formed in or on the substrate. The device may include a signal electrode extending along a longitudinal axis. The signal electrode may include a first portion with a proximal end that is proximal to the optical waveguide, to induce a signal from the signal electrode to the optical waveguide. The signal electrode may include a second portion, at least partially attached to or continuous with a distal end of the first portion. The device may include one or more ground electrodes that form an enclosure. The enclosure may enclose the signal electrode with regard to a side of the substrate in a plane perpendicular to the longitudinal axis.

20 Claims, 26 Drawing Sheets

(56) References Cited

U.S. PATENT DOCUMENTS

| | | | |
|---|---|---|---|
| 5,563,965 A * | 10/1996 | Madabhushi | G02F 1/0356 |
| | | | 385/2 |
| 5,598,490 A | 1/1997 | Hakogi et al. | |
| 5,680,497 A | 10/1997 | Seino et al. | |
| 5,764,822 A | 6/1998 | Madabhushi | |
| 5,787,211 A | 7/1998 | Gopalakrishnan | |
| 5,790,719 A | 8/1998 | Mitomi et al. | |
| 5,841,568 A * | 11/1998 | Miyakawa | G02F 1/2255 |
| | | | 359/245 |
| 5,895,742 A | 4/1999 | Lin | |
| 6,069,729 A | 5/2000 | Gill et al. | |
| 6,198,855 B1 | 3/2001 | Hallemeier et al. | |
| 6,310,700 B1 * | 10/2001 | Betts | B82Y 10/00 |
| | | | 359/2 |
| 6,545,791 B1 | 4/2003 | McCaughan et al. | |
| 6,580,843 B2 | 6/2003 | Doi et al. | |
| 6,584,240 B2 | 6/2003 | Doi et al. | |
| 6,721,085 B2 | 4/2004 | Sugiyama et al. | |
| 6,845,183 B2 | 1/2005 | Cheung et al. | |
| 7,171,063 B2 | 1/2007 | Feke et al. | |
| 7,231,101 B2 | 6/2007 | Nagata | |
| 7,426,326 B2 | 9/2008 | Moeller et al. | |
| 9,964,784 B2 | 5/2018 | McBrien et al. | |
| 2003/0138179 A1 * | 7/2003 | Akiyama | B82Y 20/00 |
| | | | 385/2 |
| 2003/0228081 A1 | 12/2003 | Tavlykaev et al. | |
| 2004/0067021 A1 * | 4/2004 | Miyama | G02F 1/0322 |
| | | | 385/40 |
| 2009/0290206 A1 * | 11/2009 | Sugiyama | G02F 1/2255 |
| | | | 359/254 |
| 2011/0081107 A1 | 4/2011 | Sugiyama | |
| 2012/0099812 A1 * | 4/2012 | Kissa | G02F 1/2255 |
| | | | 385/2 |
| 2014/0294380 A1 | 10/2014 | Sugiyama | |

OTHER PUBLICATIONS

Miyamoto et al., "Evaluation of LiNbO3 intensity modulator using electrodes buried in buffer layer," Electronics Letters, May 21, 1992, vol. 28, No. 11, pp. 976-977.

Noguchi et al., "Millimeter-wave TiLiNbO3 optical modulators," IEEE Journal of Lightwave Technology, vol. 16, No. 4, Apr. 1998, pp. 615-619.

Kawano, "High-speed shielded velocity-matched Ti:LiNbO3 optical modulator," IEEE Journal of Quantum Electronics, Sep. 1993, vol. 29, No. 9, pp. 2466-2475.

Nuvotronics, "Polystrata Architecture," http://www.nuvotronics.com/architecture.php, Feb. 1, 2014, 2 pages.

* cited by examiner

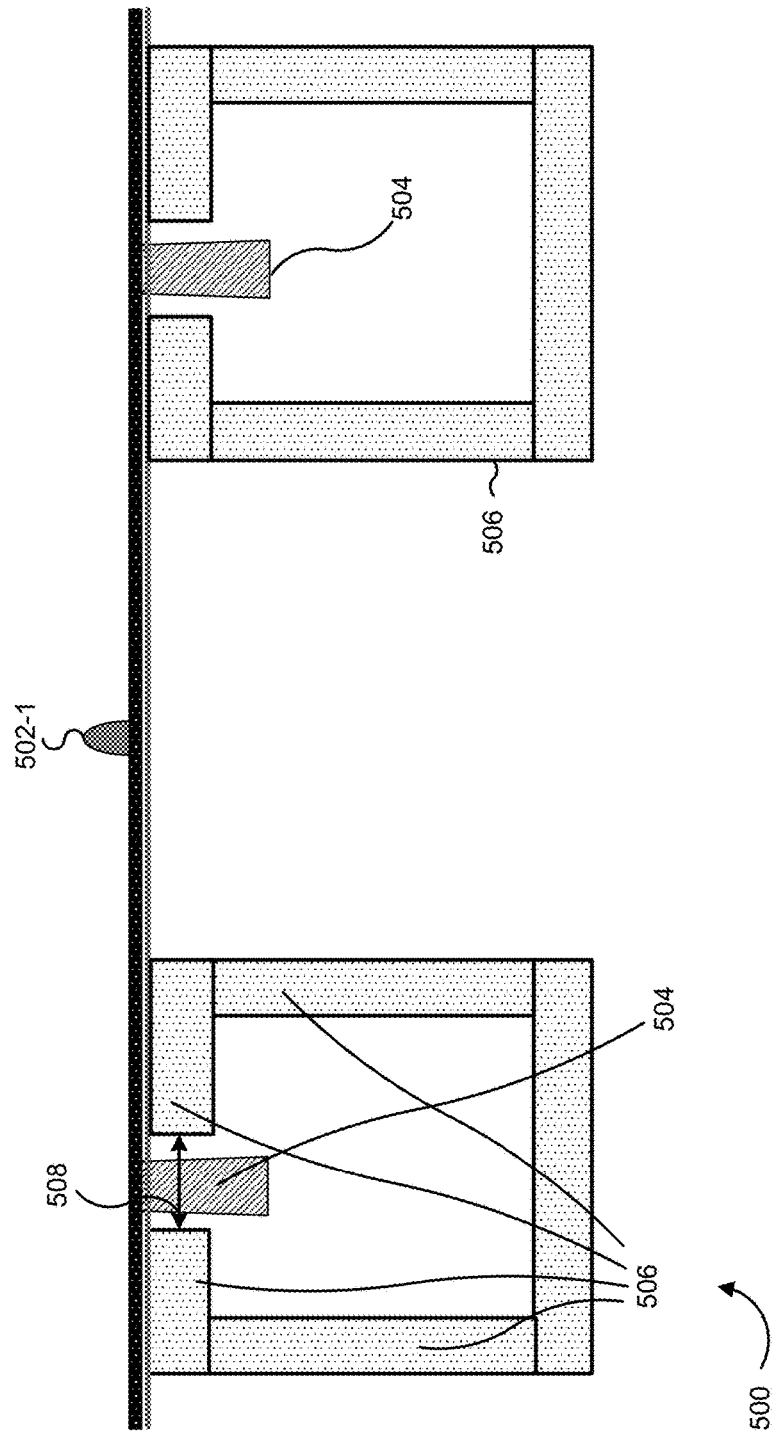

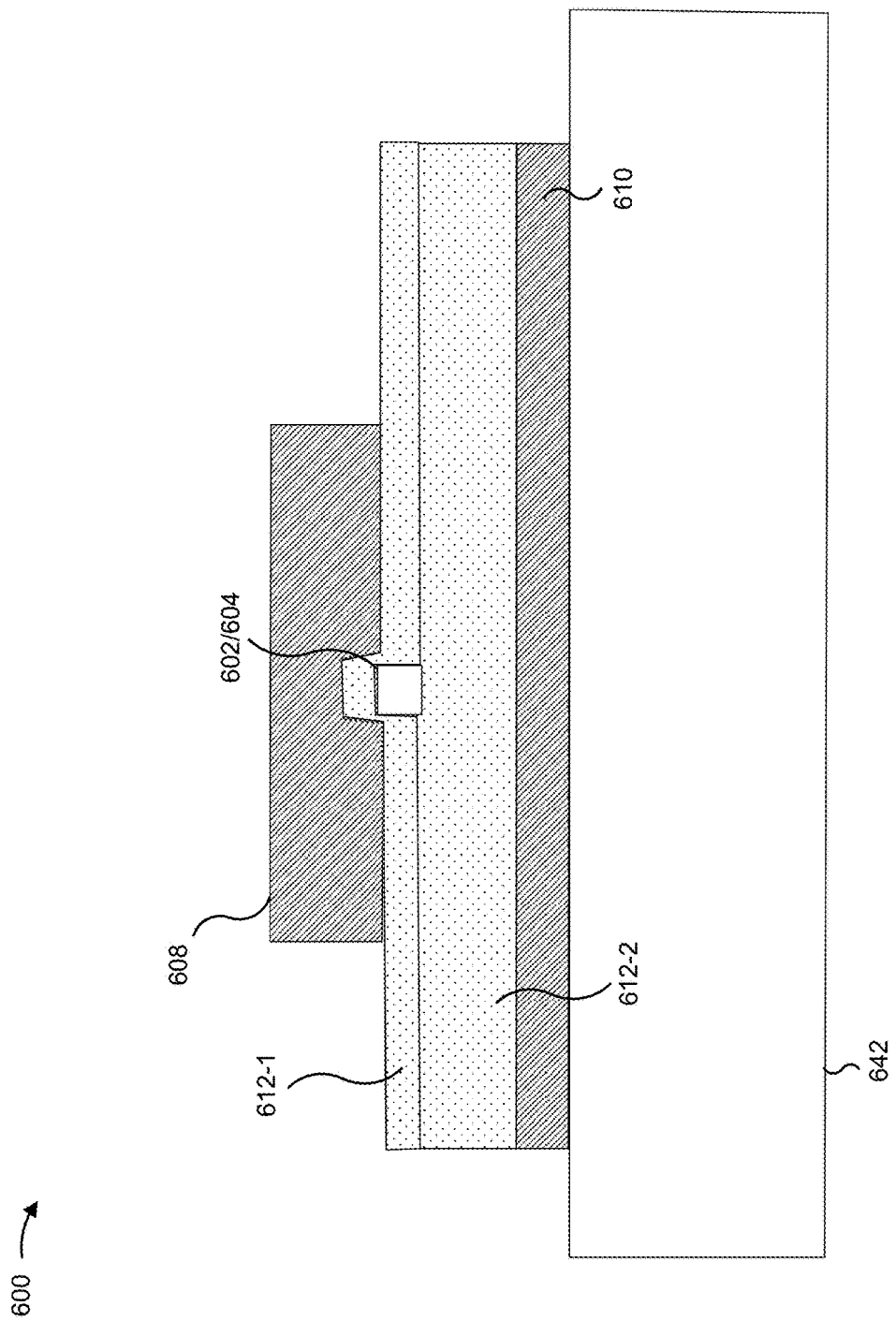

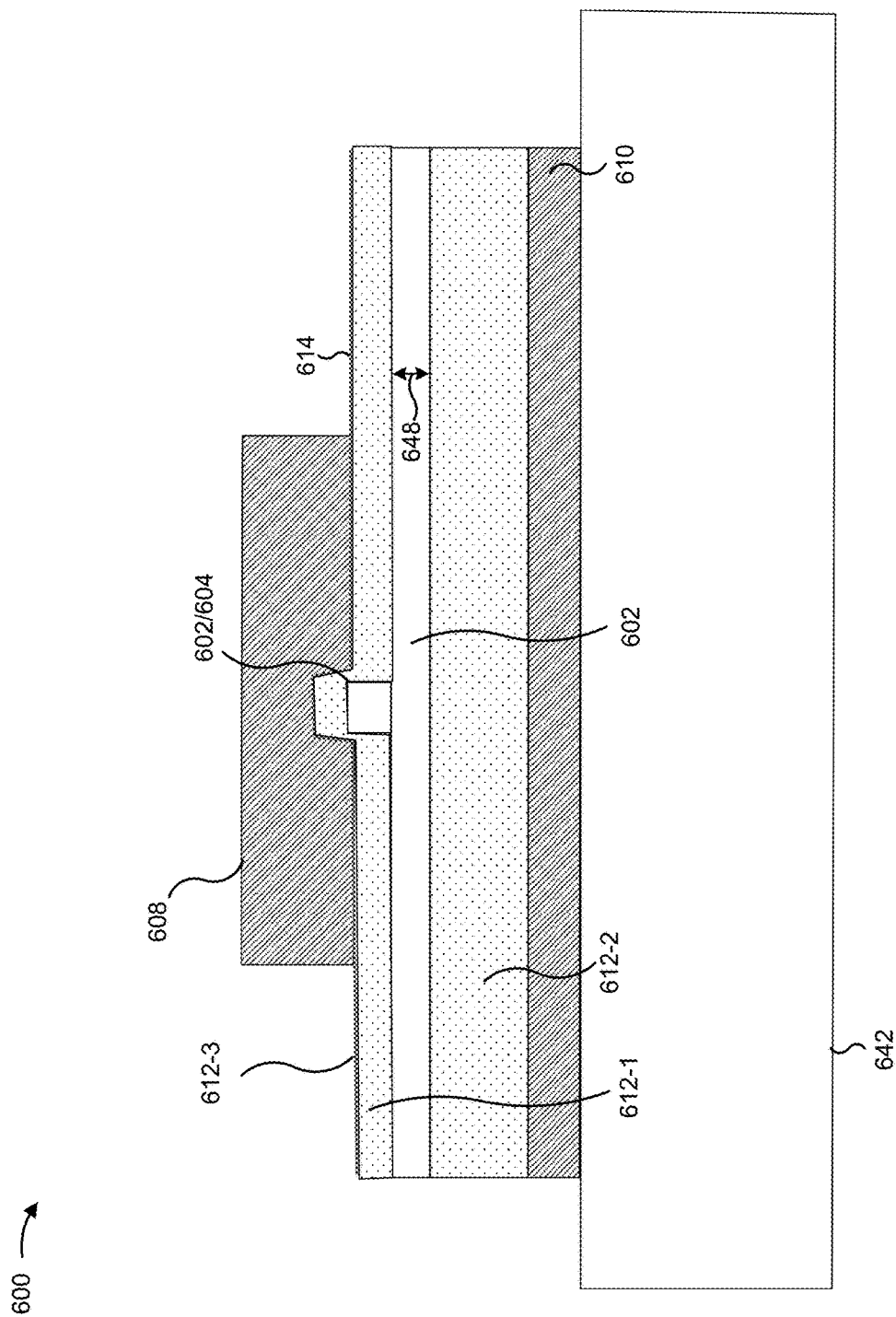

ELECTRODE STRUCTURES FOR OPTICAL MODULATORS

RELATED APPLICATIONS

This application claims priority under 35 U.S.C. § 119 to U.S. Provisional Patent Application No. 62/143,427, filed Apr. 6, 2015, and U.S. Provisional Patent Application No. 62/143,961, filed Apr. 7, 2015, the contents of which are incorporated by reference herein in their entirety.

TECHNICAL FIELD

The present disclosure relates to optical communication technology. More particularly, the present disclosure relates to modulators for modulation of optical signals.

BACKGROUND

A modulator is a device that uses a modulation signal to modify a periodic waveform, called a carrier signal, to add information to the carrier signal. For example, a modulator may use an electrical current in a signal electrode to generate a radio frequency field, and the radio frequency field may modify the carrier signal to add information to the carrier signal. Modulators are sometimes used to convert an electrical signal into an optical signal in an optical network. In such a case, the modulation signal may be based on the electrical signal, and the optical signal may be used as the carrier signal.

SUMMARY

According to some possible implementations, a device may include a substrate. The device may include an optical waveguide formed in or on the substrate. The device may include a signal electrode extending along a longitudinal axis. The signal electrode may include a first portion with a proximal end that is proximal to the optical waveguide, to induce a signal from the signal electrode to the optical waveguide. The signal electrode may include a second portion, at least partially attached to or continuous with a distal end of the first portion. A device may include one or more ground electrodes that form an enclosure. The enclosure may enclose the signal electrode with regard to a side of the substrate in a plane perpendicular to the longitudinal axis.

According to some possible implementations, a device may include a substrate. The device may include an optical waveguide formed in or on the substrate. The device may include a signal electrode extending along a longitudinal axis. The signal electrode may include a first signal portion comprising a first end proximate to the optical waveguide to induce a signal from the signal electrode to the optical waveguide, and a second end distal from the optical waveguide. The signal electrode may include a second signal portion at least partially connected to the second end of the first signal portion. A ground electrode may include first ground portions adjacent to the substrate and on opposite lateral sides of the first signal portion. The ground electrode may include second ground portions extending between and connecting the first ground portions. The ground electrode may form an enclosure that encloses the signal electrode with regard to the substrate.

According to some possible implementations, a device may include a substrate. The device may include an optical waveguide formed on or in the substrate. The device may include an electrode structure on the substrate extending along a longitudinal axis. The electrode structure may include an enclosure comprising a ground electrode and a signal electrode. The ground electrode may comprise an interior member dividing the enclosure into a first space and a second space. The interior member may include one or more gaps connecting the first space to the second space. The signal electrode may comprise a first signal portion and a second signal portion. The first signal portion may extend from the first space through at least one of the one or more gaps into the second space. At least part of the first signal portion may be proximate to the optical waveguide to induce a signal from the signal electrode to the optical waveguide. The second signal portion in the second space may be connected to the first signal portion to reduce radio frequency loss associated with the electrode structure. The signal electrode may be enclosed, with regard to a surface of the substrate, by the enclosure in a plane perpendicular to the longitudinal axis.

BRIEF DESCRIPTION OF THE DRAWINGS

FIGS. 5A and 5B are diagrams of a cross section and a plan view of an example implementation that shows a coaxial electrode structure capable of transmitting RF signals to multiple modulators associated with multiple waveguide electrode structures; and FIGS. 6A-6I are diagrams of cross sections of an example implementation of a ground-enclosure electrode.

DETAILED DESCRIPTION

The following detailed description of example implementations refers to the accompanying drawings. The same reference numbers in different drawings may identify the same or similar elements.

In telecommunications, modulation is used to convey a message signal (e.g., a digital bit stream or an analog audio signal) inside another signal (e.g., a carrier signal, such as a radio signal, an electrical signal, an optical signal, etc.) that can be physically transmitted to a destination. A modulator is used to modulate (i.e., add information to) the carrier signal by varying one or more properties of the carrier signal using a modulation signal.

Figure 1:
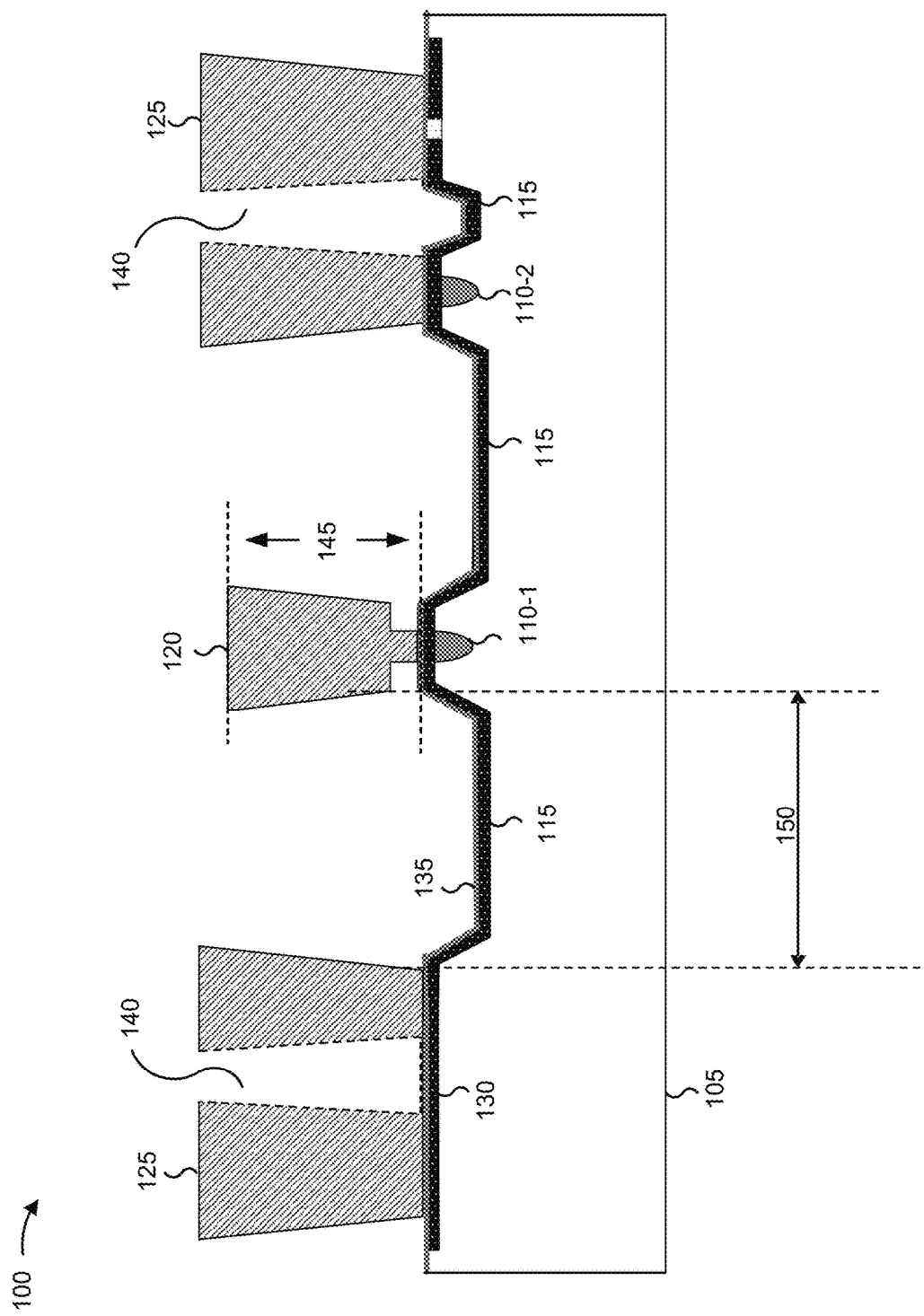
FIG. 1 is a diagram of an example implementation of a modulator with a waveguide electrode structure.

In optical communications, an electrical signal carrying information is converted into an optical signal (e.g., for long-haul transmission or for another purpose) using an optical modulator (e.g., a 40 gigabit modulator, a 100 gigabit modulator, etc.). One common type of modulator for optical applications uses an electro-optically active substrate (e.g., lithium niobate, indium phosphide, gallium arsenide, etc.) with an optical waveguide formed axially along the substrate. A signal electrode is situated along the waveguide, and the signal electrode provides the modulation signal based on the electrical signal to modulate an optical signal carried by the waveguide. One or more ground electrodes may be situated parallel to the signal electrode to control radio frequency (RF) effects on the optical signal and to ground the signal electrode. An example of a cross section of such a modulator is shown in FIG. 1. The electrode structure associated with the modulator described above, and in connection with FIG. 1, is referred to herein as a waveguide electrode structure.

To improve modulation performance, a party may improve (e.g., reduce, minimize) RF loss along the signal electrode, and may match a propagation index of the electrical signal in the signal electrode with a propagation index of the optical signal in the waveguide, which reduces mismatch in velocity along the waveguide or signal electrode and improves accuracy and efficiency of the modulation. However, electrical charge may tend to congregate in some parts of the signal electrode more than other parts. This may introduce unwanted RF effects and may increase the voltage required to drive the modulator, or may reduce the bandwidth of the modulation.

To reduce RF loss due to a shape of the ground electrode, a party may fabricate a modulator with a signal electrode that is substantially or completely enclosed by a ground electrode, which improves distribution of charges in the signal electrode and thus reduces RF loss. For example, the ground electrode may have a curved inner surface that substantially or completely encloses a curved outer surface of the signal electrode. Some implementations, described herein in connection with FIGS. 6A-6I, relate to such a ground-enclosure electrode. However, a ground electrode and/or a signal electrode with a curved surface may be difficult to fabricate using photolithographic or epitaxial methods.

Implementations described herein describe a coaxial electrode structure that can be affixed to or situated adjacent to a waveguide electrode structure of a modulator (such as the waveguide electrode structure shown in FIG. 1) to improve RF performance, reduce RF loss, and improve modulation performance of the waveguide electrode structure. The coaxial electrode structure may have a signal electrode in contact with a signal electrode of the waveguide electrode structure and/or one or more ground electrode in contact with one or more ground electrodes of the waveguide electrode structure. In some implementations, the coaxial electrode structure may be approximately square or rectangular in cross section, which simplifies fabrication of the coaxial electrode structure. In this way, the coaxial electrode structure improves performance of modulators that include the waveguide electrode structure.

As used herein, "coaxial" refers to the arrangement of the coaxial electrode structure as an inner conductor (i.e., a coaxial signal electrode) and an outer conductor (i.e., a coaxial ground electrode) that are separated by an insulator (e.g., air, nitrogen, vacuum, photoresist, etc.). The coaxial signal electrode and the coaxial ground electrode may or may not share a common longitudinal axis, and implementations described herein are not limited to those in which the coaxial signal electrode shares a common longitudinal axis with the coaxial ground electrode.

FIG. 1 is a diagram of an example implementation of a modulator with a waveguide electrode structure 100. FIG. 1 shows a cross section of waveguide electrode structure 100 in a cutting plane orthogonal to a longitudinal axis of waveguide electrode structure 100. Assume that waveguide electrode structure 100 is approximately uniform along the longitudinal axis.

As shown in FIG. 1, waveguide electrode structure 100 may include active substrate 105. Active substrate 105 includes an electro-optic substrate of an electro-optically active material, such as lithium niobate, indium phosphide, gallium arsenide, silicon, or the like. As shown, waveguides 110-1 and 110-2 may be situated axially parallel to, or may be formed on or within, active substrate 105. Waveguides 110-1 and 110-2 include an optical waveguide, such as an optical fiber, a channel waveguide, a ridge waveguide, a rib waveguide, or the like. Waveguides 110-1 and 110-2 may be formed upon or within active substrate 105 using proton exchange, reactive ion etching, titanium indiffusion, ion beam implantation, or the like. Here, two optical waveguides are shown (e.g., waveguides 110-1 and 110-2). By including waveguide 110-1 in association with signal electrode 120 and waveguide 110-2 in association with ground electrode 125, waveguide electrode structure 100 may improve modulation efficiency by, for example, ten to fifteen percent relative to the design without waveguide 110-2 under ground electrode 125.

As shown, active substrate 105 may include substrate slots 115 (shown here as depressions in a surface of active substrate 105 in the areas between signal electrode 120 and ground electrodes 125, and as a depression in the surface of active substrate 105 in a location of stress reduction slot 140 adjacent to waveguide 110-2). Substrate slots 115 improve modulation performance of waveguide electrode structure 100 by focusing RF signals from signal electrode 120 to waveguide 110-1 and/or waveguide 110-2.

As shown, signal electrode 120 may be situated adjacent to, proximate to, and/or axially parallel to waveguide 110-1. For example, signal electrode 120 may be in contact with waveguide 110-1, may be located within 3 microns of waveguide 110-1, may be attached to a layer of material at a point or area opposite a surface of the layer of material where the layer of material contacts waveguide 110-1, or the like. Signal electrode 120 includes a conductive material, such as copper, gold, or the like. Signal electrode 120 carries a modulation signal and generates an RF field based on the modulation signal. In some implementations, signal electrode 120 may be approximately rectangular-shaped. Signal electrode 120 may have a proximal end that is proximal to waveguide 110-1 and a distal end opposite the proximal end.

Here, signal electrode 120 and ground electrodes 125 are shown with outwardly sloping sides, which may be associated with the lithographic and electroplating process used to fabricate signal electrode 120 and ground electrodes 125. In a situation where signal electrode 120 and ground electrodes 125 are fabricated using another method, signal electrode 120 and ground electrodes 125 may not include outwardly sloping sides.

As shown, signal electrode 120 includes a square base with a narrower cross section (e.g., narrower than a top part of signal electrode 120) situated near waveguide 110-1. The narrower cross section of the base may improve modulation efficiency of signal electrode 120 by focusing RF fields generated by signal electrode 120 on waveguide 110-1.

As shown, ground electrodes 125 may be situated parallel to and/or on opposite lateral sides of signal electrode 120 and/or waveguides 110-1 or 110-2. Ground electrode 125 includes one or more electrodes fabricated using a conductive material, such as copper, gold, or the like. Ground electrode 125 may ground RF fields generated by signal electrode 120, which improves modulation performance of waveguide electrode structure 100 by confining the RF field and reducing RF interference from adjacent electrodes. As shown, in some implementations, ground electrode 125 may include a first ground electrode and a second ground electrode that are provided on opposite sides of signal electrode 120. Ground electrode 125 may have a proximal end that is proximal to substrate 105 and a distal end opposite the proximal end.

As further shown, signal electrode 120 and ground electrodes 125 may be mounted to buffer layer 130 and/or bleed layer 135. Buffer layer 130 includes a layer of dielectric material that electrically decouples ground electrode 125 from active substrate 105 at RF frequencies to optimize velocity matching between the RF and optical signals, while allowing minute leakage current to flow at DC (e.g., silicon dioxide or another dielectric material) in order to allow for DC biasing of an interferometer created with the two waveguides 110, (e.g., in separate electrodes at another longitudinal location along the waveguide 110). Buffer layer 130 may also be undoped in part of or all of the section where the RF electrode exists.

Bleed layer 135 includes one or more materials that mitigate pyroelectric effects from active substrate 105 (e.g., titanium silicon nitride, or the like). As shown, ground electrodes 125 may include stress reduction slots 140. Stress reduction slots 140 are gaps in ground electrode 125, and may mitigate stress caused by thermal expansion of active substrate 105, waveguides 110, ground electrode 125, and/or placement of signal electrode 120.

By increasing a height of signal electrode 120 (i.e., height 145) and/or a clearance between signal electrode 120 and ground electrode 125 (i.e., gap 150), RF performance of waveguide electrode structure 100 can be improved by causing RF currents to be more spread out across the perimeter of the RF electrodes. However, increasing height 145 and/or gap 150 requires increased drive voltage to achieve a particular modulation depth. Furthermore, as height 145 increases, fabrication of signal electrode 120 becomes increasingly difficult. Still further, when ground electrode 125 does not partially or completely enclose signal electrode 120, electrical charge may tend to congregate at a bottom of signal electrode 120 (i.e., near waveguide 110-1) which reduces efficiency of signal electrode 120 by increasing RF skin-effect loss.

As indicated above, FIG. 1 is provided merely as an example. Other examples are possible and may differ from what was described with regard to FIG. 1.

FIGS. 2A-2K are diagrams of cross sections and plan views of an example implementation of a coaxial electrode structure 200 to be implemented with a waveguide electrode structure. Coaxial electrode structure 200 is shown in FIGS. 2A-2K with a dotted fill pattern, and the waveguide electrode structure is shown in FIGS. 2A-2K with a diagonally lined fill pattern.

Figure 2A:
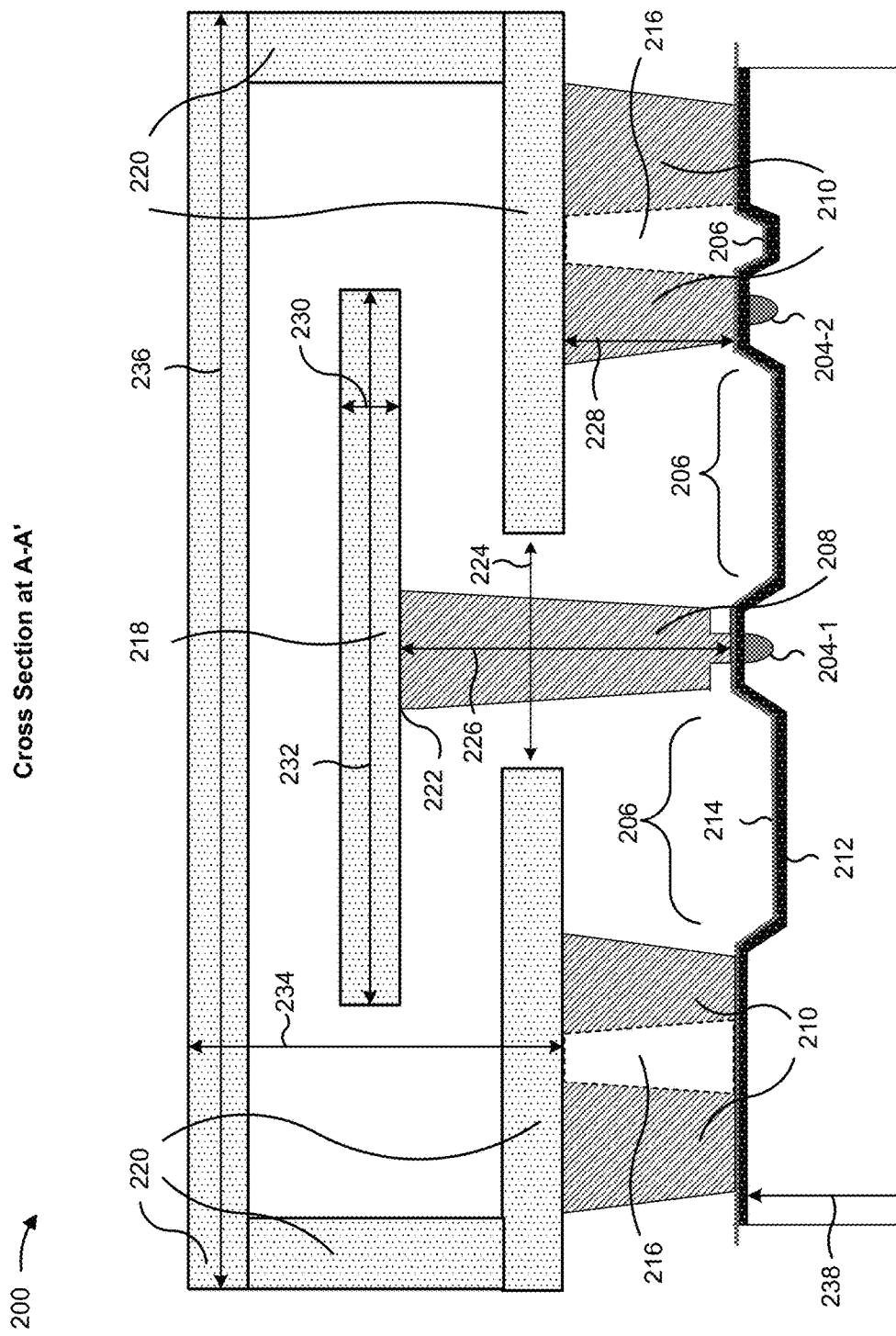
FIGS. 2A-2K are diagrams of cross sections and plan views of an example implementation of a coaxial electrode structure to be implemented with a waveguide electrode structure.
Figure 2B:
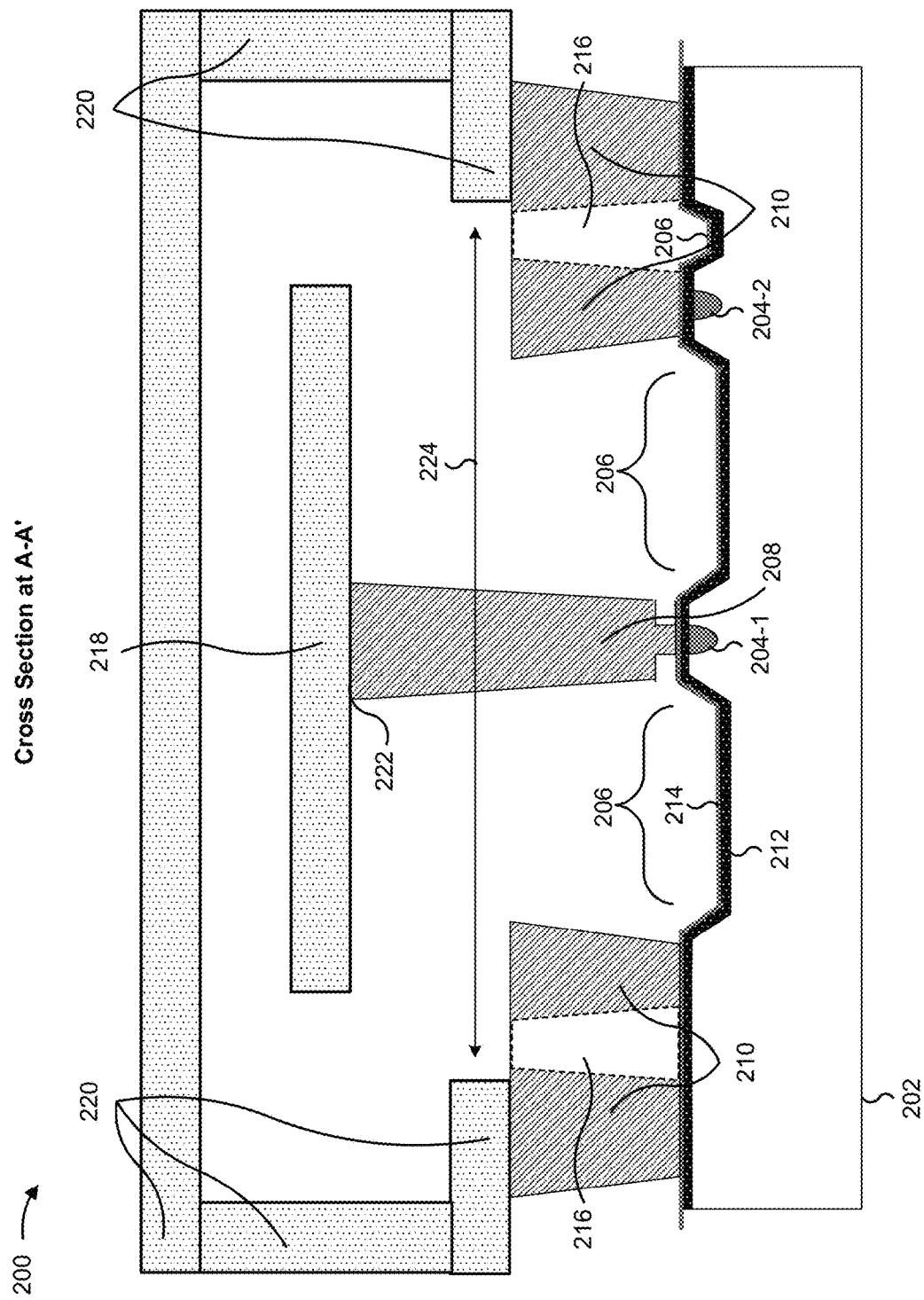
Figure 2C:
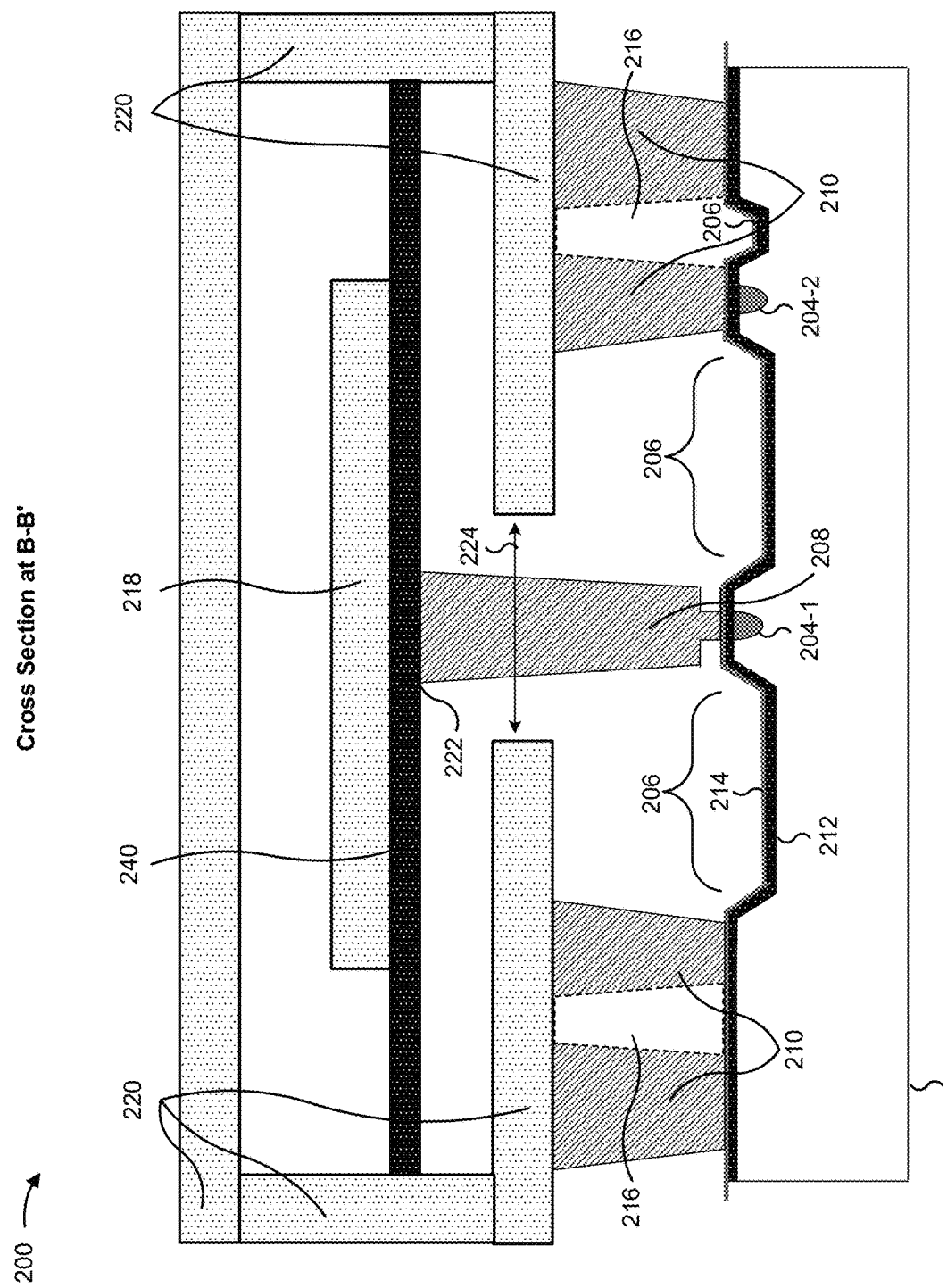
Figure 2D:
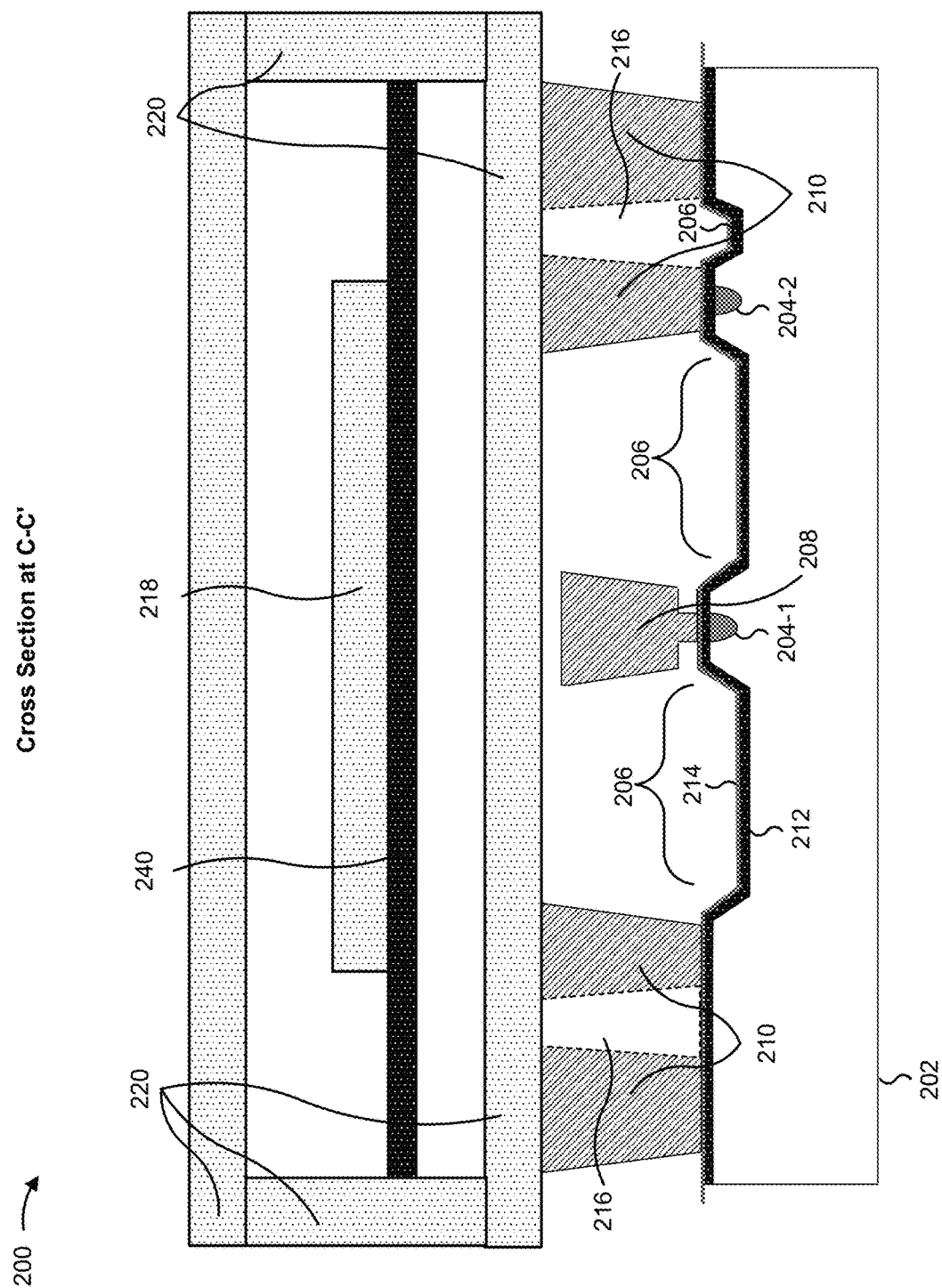
Figure 2E:
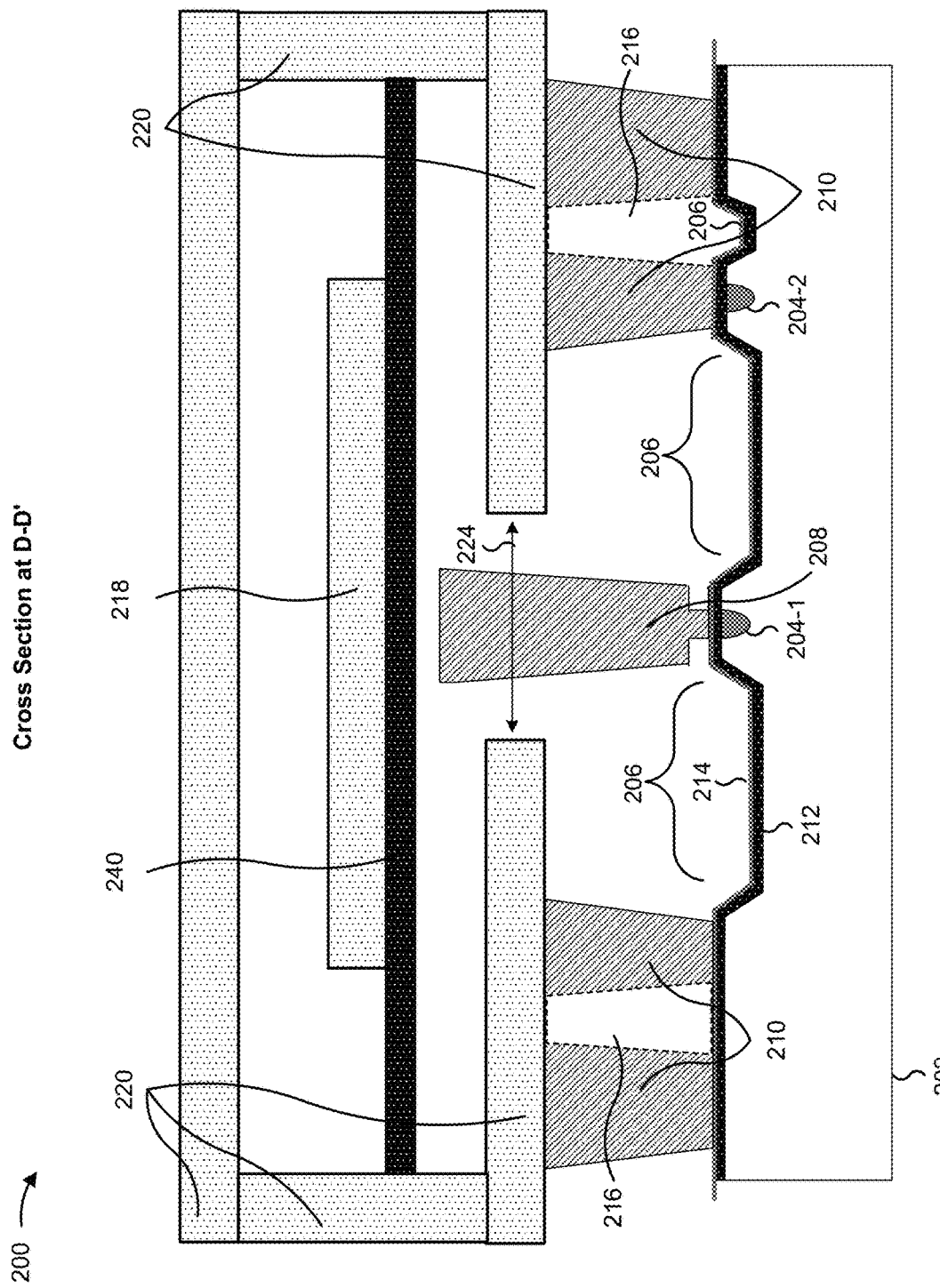
Figure 2F:
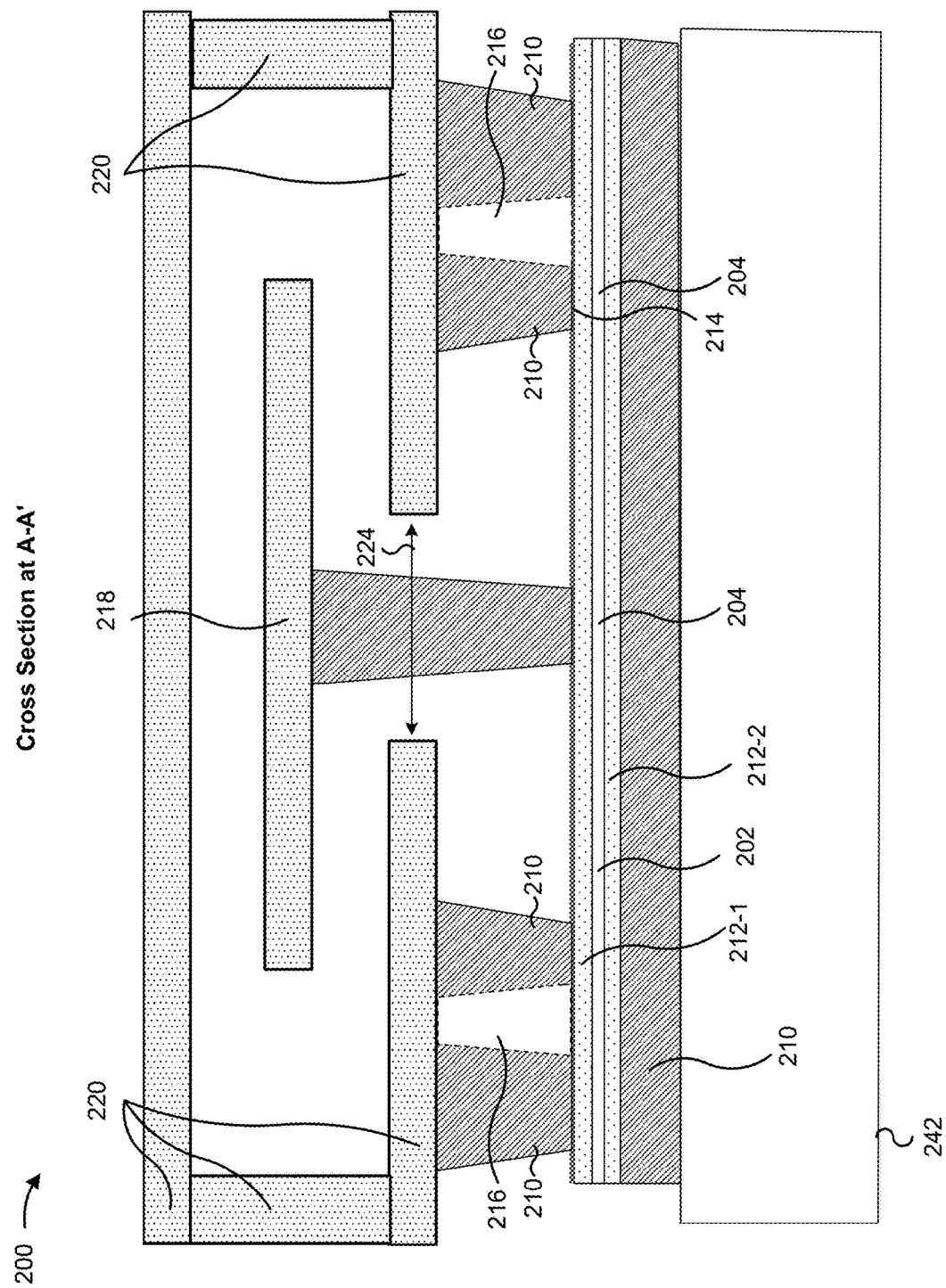
Figure 2G:
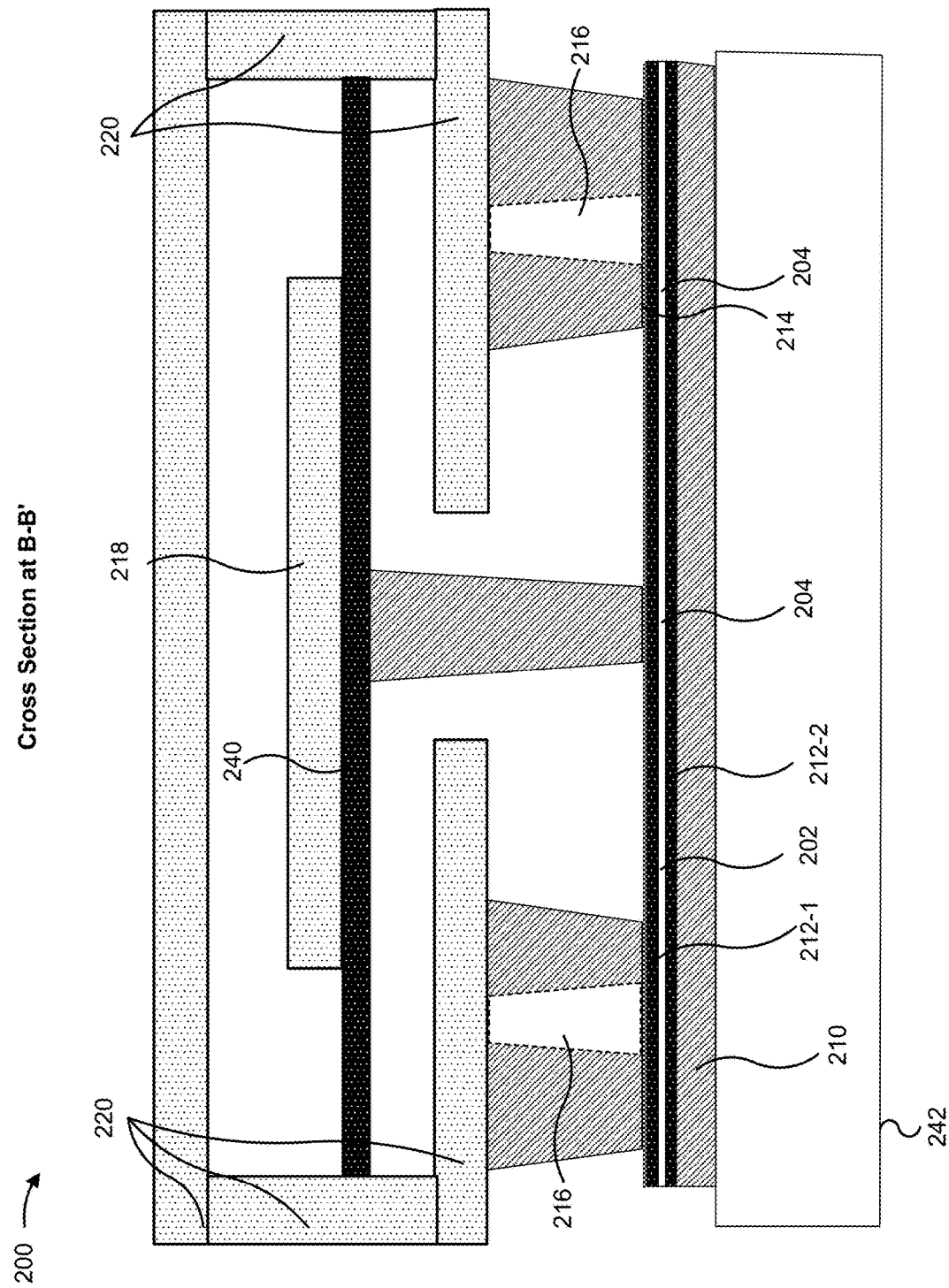
Figure 2H:
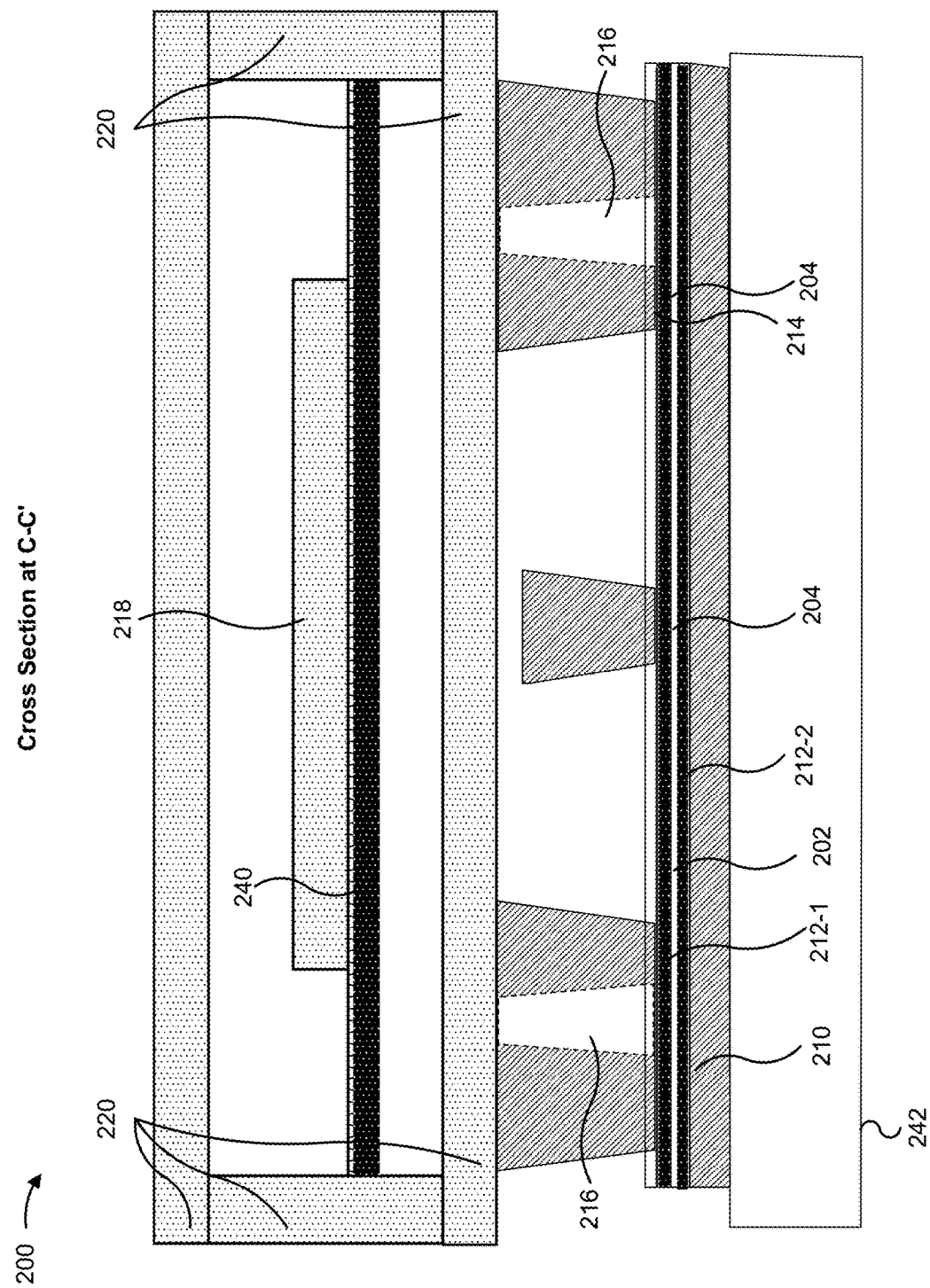
Figure 2I:
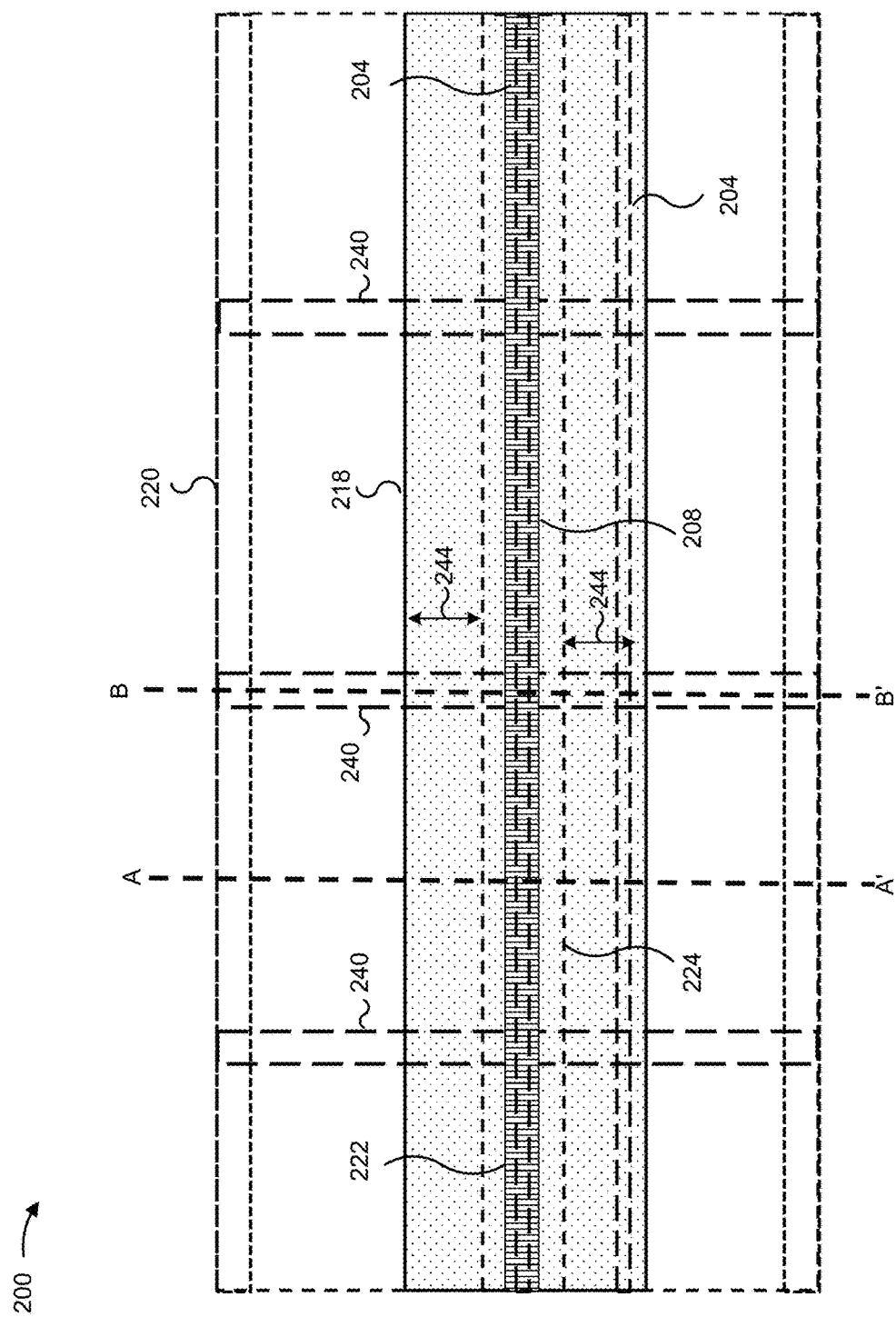
Figure 2J:
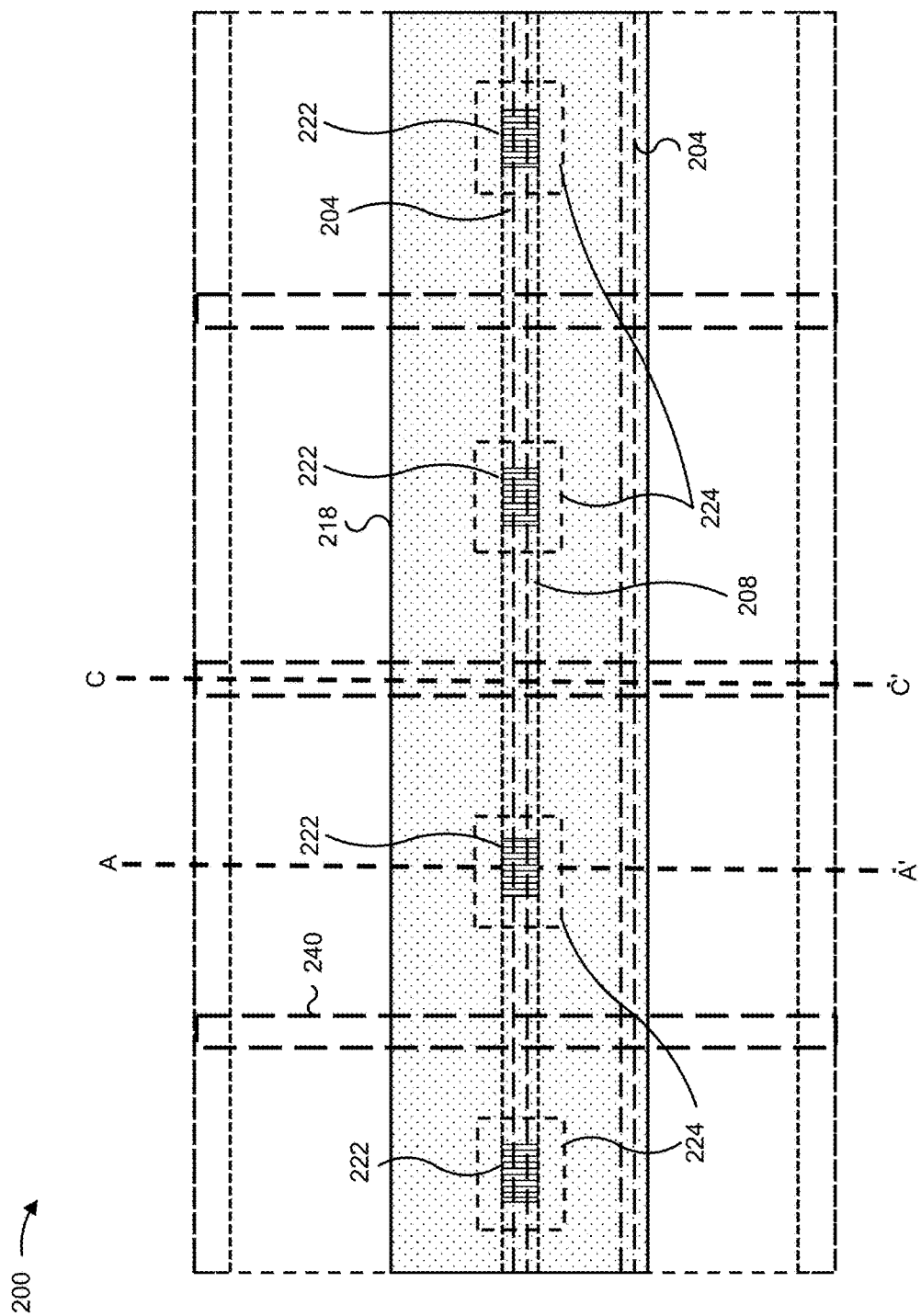
Figure 2K:
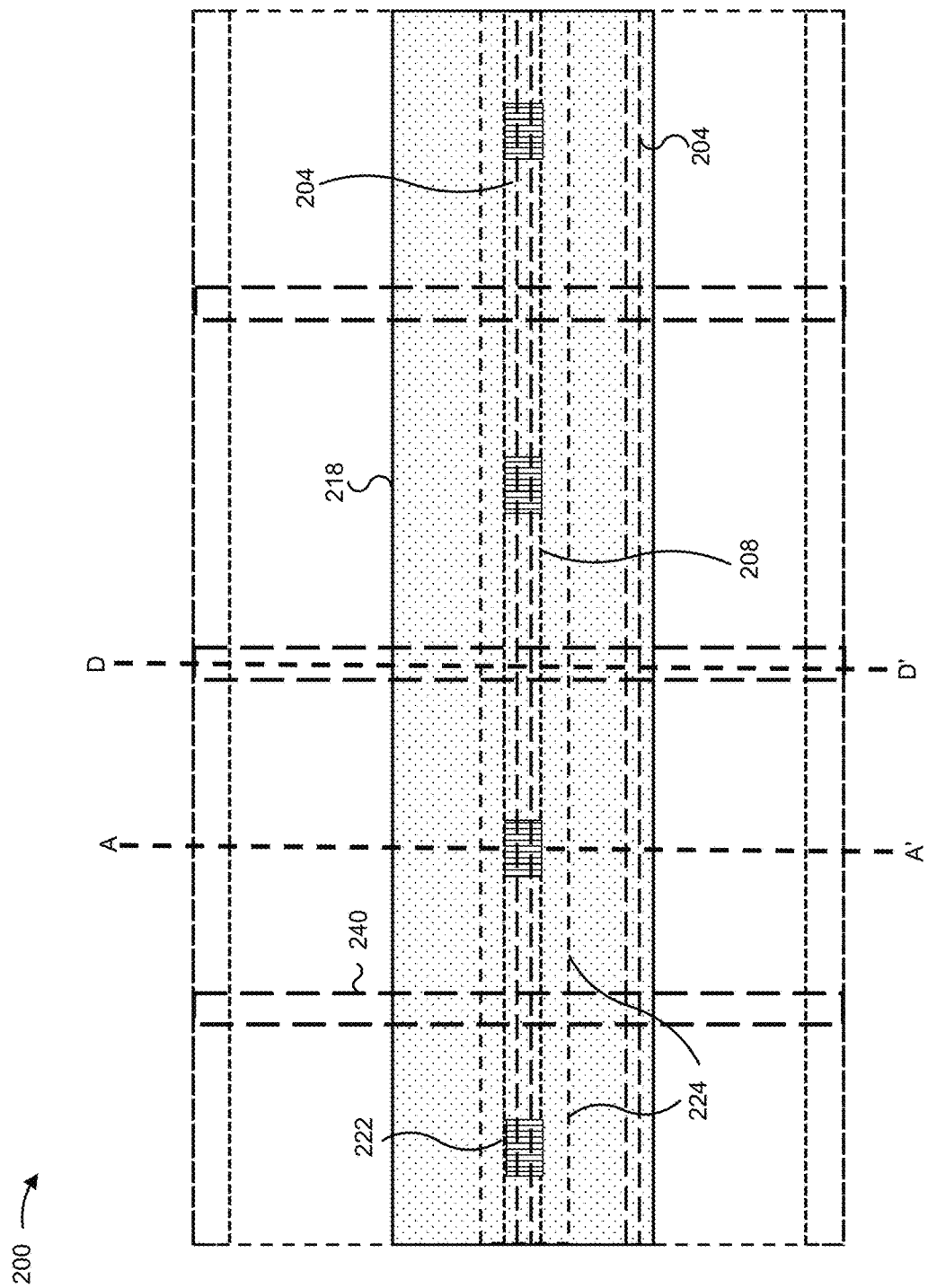

FIG. 2A is a diagram of cross section A-A', shown in FIGS. 2I-2K. As shown in FIG. 2A, the waveguide electrode structure may include active substrate 202, waveguides 204 (shown as waveguide 204-1 and waveguide 204-2), substrate slots 206, waveguide signal electrode 208, waveguide ground electrodes 210, buffer layer 212, bleed layer 214, and stress slots 216. Active substrate 202, waveguides 204, substrate slots 206, waveguide signal electrode 208, waveguide ground electrode 210, buffer layer 212, bleed layer 214, and stress slot 216 may be fabricated using the materials described with regard to the corresponding components of waveguide electrode structure 100, as described in connection with FIG. 1, using any reasonable fabrication method known in the art. Unlike FIG. 1, the waveguide signal electrode 208 and the waveguide ground electrodes 210 are designed such that the waveguide signal electrode 208 may have a greater height than the waveguide ground electrodes 210.

As further shown in FIG. 2A, coaxial electrode structure 200 includes coaxial signal electrode 218 and coaxial ground electrode 220. Coaxial signal electrode 218 and coaxial ground electrode 220 may be fabricated from copper, gold, or the like. In some implementations, coaxial signal electrode 218 and/or coaxial ground electrode 220 may be fabricated using a photolithography process, an epitaxial growth process, or the like, which may require fewer lithographic or epitaxial steps than fabricating a ground-enclosure electrode with curved surfaces to form an enclosure, such as the ground-enclosure electrodes described in connection with FIGS. 6A-6E, below. In some implementations, coaxial signal electrode 218 may have an approximate cross-sectional shape of a rectangle, a square, a circle, an oval, or a different type of cross-sectional shape.

In some implementations, coaxial signal electrode 218 and coaxial ground electrode 220 may be fabricated independently of the signal electrode 208 and waveguide ground electrodes 210, and the coaxial signal electrode 218 may then be aligned and connected as illustrated.

In some implementations, coaxial signal electrode 218 and coaxial ground electrode 220 may be fabricated when the waveguide electrode structure shown in FIGS. 2A-2K is fabricated. For example, coaxial signal electrode 218 and coaxial ground electrode 220 may be fabricated as part of a photolithography process to form waveguide signal electrode 208 and waveguide ground electrode 210. In such implementations, coaxial signal electrode 218 may be referred to as a first portion of a signal electrode, and waveguide signal electrode 208 may be referred to as a second portion of the signal electrode, or vice versa. Furthermore, in such implementations, coaxial ground electrode 220 may be referred to as a first ground electrode, of one or more ground electrodes, and waveguide ground electrode 210 may be referred to as second and/or third ground electrodes, of the one or more ground electrodes.

Additionally, or alternatively, coaxial signal electrode 218 and coaxial ground electrode 220 may be configured to be attached to the waveguide electrode structure at attachment point 222 and/or at attachment points between waveguide ground electrode 210 and coaxial ground electrode 220 using any reasonable attachment method known in the art. Attachment point 222 includes surface areas of coaxial signal electrode 218 at which coaxial signal electrode 218 and waveguide signal electrode 208 are in contact, are attached to each other, are continuous with each other, share an interface, or the like. Coaxial signal electrode 218 may be attached to waveguide signal electrode 208 using any reasonable method known in the art, such as bonding, compression, or the like.

In such implementations, coaxial signal electrode 218 may be referred to as a first portion of a signal electrode, and waveguide signal electrode 208 may be referred to as a second portion of the signal electrode, or vice versa. Furthermore, in such implementations, coaxial ground electrode 220 may be referred to as a first ground electrode, of one or more ground electrodes, and waveguide ground electrode 210 may be referred to as second and/or third ground electrodes, of the one or more ground electrodes. In other words, implementations described herein may be described as having a first portion and a second portion of a signal electrode, and/or having first, second, and third ground electrodes, irrespective of whether coaxial electrode structure 200 and the waveguide electrode structure are manufactured as part of the same process, or are assembled after manufacture using different processes.

In some implementations, coaxial ground electrode 220 may at least substantially enclose (e.g., 75%, 80%, 95%, 100%) an outer surface of coaxial signal electrode 218 along a longitudinal axis of coaxial electrode structure 200. For example, an inner surface of coaxial ground electrode 220 may include gap 224 which causes the outer surface of coaxial signal electrode 218 to be less than fully enclosed along the longitudinal axis of coaxial electrode structure 200. In some implementations, flanges of coaxial ground electrode 220 may extend into spaces between coaxial signal electrode 218 and active substrate 202 to form gap 224. In some implementations, a ratio of a surface area of the inner surface with gap 224 to a surface area of the inner surface without gap 224 may be approximately 75%, 80%, 95%, 100%, or the like.

As further shown, a gap or space exists between coaxial signal electrode 218 and coaxial ground electrode 220, which may include air, nitrogen, vacuum, or another electrical insulator. For example, coaxial ground electrode 220 may form a partial enclosure, a substantial enclosure, or a complete enclosure for coaxial signal electrode 218. In some implementations, as shown in FIG. 2A, gap 224 may have a width of approximately 50 microns or in a range of approximately 20 microns to 200 microns. In some implementations, the gap between the outer surface of coaxial signal electrode 218 and the inner surface of coaxial ground electrode 220 (e.g., in the vertical direction and/or the horizontal direction) may have a width of approximately 50 microns or in a range of approximately 20 microns to 200 microns.

In some implementations, waveguide signal electrode 208 may have a height 226 of approximately 70 microns or in a range of approximately 30 microns to 100 microns. In some implementations, waveguide ground electrode 210 may have a height 228 of approximately 10 microns or in a range of approximately 5 to 50 microns. In some implementations, coaxial signal electrode 218 may have a depth 230 of 20 microns or in a range of approximately 10 to 50 microns. In some implementations, coaxial signal electrode 218 may have a width 232 of approximately 100 microns or in a range of approximately 50 to 400 microns.

In some implementations, waveguide ground electrodes 210 may be significantly reduced in height, or reduced in height to a thin layer sufficient for attaching and electrically conducting with coaxial ground electrodes 220. In such a case, waveguide ground electrode 210 may have a height 228 in a range of approximately 5 microns to 15 microns, which reduces a quantity of material needed to fabricate waveguide ground electrode 210 and reduces a size of the waveguide electrode structure.

In some implementations, coaxial ground electrode 220 and waveguide ground electrode 210 may form an enclosure around coaxial signal electrode 218 and waveguide signal electrode 208. In such implementations, a part of coaxial ground electrode 220 may extend into the enclosure between coaxial signal electrode 218 and active substrate 202. One or more gaps 224 may be provided in the part that extends into the enclosure, and waveguide signal electrode 208 may extend through the at least one of the one or more gaps 224.

Additionally, or alternatively, the enclosure may include an interior member in which the one or more gaps 224 are provided. The interior member may divide the enclosure into a first space and a second space. Coaxial signal electrode 218 may be situated in the second space, and waveguide signal electrode 208 may extend from coaxial signal electrode 218 through the one or more gaps 224 into the first space. For example, the first space may be adjacent to waveguide 204.

In some implementations, coaxial ground electrode 220 may have a depth 234 of approximately 100 microns or in a range of approximately 50 microns to 400 microns. In some implementations, coaxial ground electrode 220 may have a width 236 of approximately 300 microns or in a range of approximately 150 microns to 600 microns. In some implementations, coaxial ground electrode 220 may have a thickness of approximately 20 microns or in a range of approximately 5 microns to 50 microns. In some implementations, active substrate 202 may have a thickness 238 of approximately 200 microns or in a range of 10 microns to 500 microns.

As shown, in some implementations, first portions of coaxial ground electrode 220 may extend perpendicularly away from active substrate 202, and may terminate further from active substrate 202 than coaxial signal electrode 218. As further shown, in such implementations, a second portion of coaxial ground electrode 220 may be situated between the first portions of coaxial ground electrode 220, thereby enclosing coaxial signal electrode 218. The first and second portions of coaxial ground electrode 220, as well as waveguide ground electrode 210, may form an enclosure that encloses waveguide signal electrode 208 and coaxial signal electrode 218 with regard to a particular surface, side, or face of active substrate 202 (e.g., a surface, side, or face proximate to waveguide ground electrode 210).

FIG. 2B is a diagram of another example implementation cross section A-A', shown in FIGS. 2I-2K. As shown in FIG. 2B, in some implementations, gap 224 may be wider than in the implementation shown in FIG. 2A, causing bottom flanges of coaxial ground electrode 220 not to extend under coaxial signal electrode 218. For example, gap 224, as shown in FIG. 2B, may have a width of approximately 170 microns or in a range of approximately 150 microns to 400 microns. As another example, a ratio of the width of gap 224 to the width of coaxial signal electrode 218 may be approximately 80% or in a range of 50% to 90%.

The wider gap 224 may cause field lines of the RF field generated by coaxial electrode structure 200 to terminate on waveguide ground electrode 210, as well as on coaxial ground electrode 220. The example implementation shown in FIG. 2B may, therefore, have lower air capacitance than the example implementation shown in FIG. 2A, and may have a more uniform RF field strength around waveguide signal electrode 208 and coaxial signal electrode 218.

As used herein, air capacitance is defined as the capacitance per unit length of coaxial electrode structure 200/waveguide electrode structure 100 when all dielectric materials are removed, and is used to configure microwave-optical velocity matching in the modulator. If the air capacitance in the example implementation shown in FIG. 2A is too large, the microwave propagation index may be lower than the optical propagation index, causing velocity mismatch. The example implementation shown in FIG. 2B may reduce the air capacitance, thereby increasing microwave index relative to the example implementation shown in FIG. 2A.

FIG. 2C is a diagram of cross section B-B', shown in FIG. 2I. As shown, at cross section B-B', coaxial electrode structure 200 includes dielectric bridge 240. Dielectric bridge 240 includes a dielectric material that structurally supports coaxial signal electrode 218 and/or that attaches coaxial signal electrode 218 to coaxial ground electrode 220. For example, dielectric bridge 240 may extend from a first surface of coaxial ground electrode 220 to a second surface of coaxial ground electrode 220, and coaxial signal electrode 218 may be attached to dielectric bridge 240 in between the first surface and the second surface. In some implementations, coaxial electrode structure 200 may include multiple dielectric bridges 240 spaced along a longitudinal axis of coaxial electrode structure 200 (e.g., at a regular interval, at an irregular interval, etc.). In some implementations, coaxial signal electrode 218 may be supported by dielectric bridge 240 and/or by a connection with waveguide signal electrode 208.

In FIG. 2C, dielectric bridge 240 is in contact with waveguide signal electrode 208, which may cause deformation of waveguide signal electrode 208 and/or coaxial signal electrode 218 during a bonding process to bond waveguide signal electrode 208 and/or coaxial signal electrode 218 to dielectric bridge 240. The example implementation shown in FIG. 2C may improve conductive coupling between coaxial electrode structure 200 and waveguide electrode structure 100, thereby reducing the likelihood of parasitic higher-order microwave modes being supported by signal electrodes 208 and 218. Furthermore, coaxial electrode structure 200 may be simpler to fabricate when dielectric bridge 240 is to be in contact with waveguide signal electrode 208 and coaxial signal electrode 218.

FIG. 2D is a diagram of cross section C-C', shown in FIG. 2J. As shown, at some cross sections of coaxial electrode structure 200, waveguide signal electrode 208 may not extend into an enclosure of coaxial ground electrode 220, and gap 224 in coaxial ground electrode 220 may be closed. The example implementation shown in FIG. 2D may improve uniformity of an RF field generated by coaxial signal electrode 218, thereby reducing RF loss and improving modulation efficiency.

FIG. 2E is a diagram of cross section D-D', shown in FIG. 2K. As shown, in some implementations, waveguide signal electrode 208 may not be in contact with dielectric bridge 240. This may reduce deformation of waveguide signal electrode 208 and/or coaxial signal electrode 218 thereby reducing RF loss and improving modulation efficiency as compared to the example implementation shown in FIG. 2C.

A height of waveguide signal electrode 208 (e.g., height 226 in FIG. 2A) can be modified in different locations by using more than one photolithography and electro-plating step to form the top portion of waveguide signal electrode 208. In locations where height 226 is to be lower, the waveguide signal electrode pattern may be lithographically eliminated from the final signal electrode plating step.

FIG. 2F is a diagram of another example implementation of coaxial electrode structure 200 at cross section A-A', shown in FIGS. 2I-2K. As shown in FIG. 2F, in some implementations, active substrate 202 may be thinner than in the implementations shown in FIGS. 2A-2E. For example, active substrate 202 in FIG. 2F may be approximately 1 micron thick or in a range of thickness from approximately 0.01 to 10 microns. Active substrate 202 may be thinned by polishing over a surface of active substrate 202, then etching or ablating in some areas using reactive ion etching, sand blasting, laser ablation, chemical etching, or the like, or by ion implantation followed by lift-off of a very thin layer of the electro-optic material.

As further shown, in some implementations, a layer of waveguide ground electrode 210 may be attached to a lower surface of active substrate 202 (i.e., a surface opposite a surface of active substrate 202 to which waveguide signal electrode 208 is attached, a surface opposite bleed layer 214, etc.), which reduces RF loss and improves modulation efficiency. In such implementations, active substrate 202 may be provided between buffer layers 212-1 and 212-2. In some implementations, buffer layer 212-2 may not be included. As further shown, in such implementations, coaxial electrode structure 200 may include support substrate 242, which provides structural support for coaxial electrode structure 200. In some implementations, the waveguide electrode structure and/or coaxial electrode structure 200 may be formed upon support substrate 242 (e.g., using a photolithographic process, an epitaxial process, etc.).

FIGS. 2G and 2H are diagrams of an example implementation of coaxial electrode structure 200 at cross sections B-B' and C-C', which are shown in FIGS. 2I and 2J, respectively. FIGS. 2G and 2H correspond to the example implementation described with regard to FIG. 2F (e.g., with a thin active substrate 202, a support substrate 242, and buffer layers 212-1 and optionally 212-2). The example implementations shown in FIGS. 2G and 2H are similar to the example implementations shown in FIGS. 2D and 2E, respectively, with a thin active substrate 202, a support substrate 242, and buffer layers 212-1 and/or 212-2.

FIG. 2I is a plan view of coaxial electrode structure 200 showing cutting planes corresponding to cross sections A-A' and B-B'. As shown, cutting plan B-B' passes through dielectric bridge 240. As further shown, attachment point 222 between waveguide signal electrode 208 and coaxial signal electrode 218 is continuous along the length of coaxial electrode structure 200. In FIGS. 2I-2K, attachment point 222 is shown by rectangles with vertically barred fill patterns. As shown in FIG. 2I, and by reference number 244, flanges of coaxial ground electrode 220 extend under coaxial signal electrode 218 (e.g., as shown in FIG. 2A). In some implementations, flanges of coaxial ground electrode 220 may not extend under coaxial signal electrode 218 (e.g., as in FIG. 2B).

FIG. 2J is a plan view of another embodiment of coaxial electrode structure 200 showing cutting planes corresponding to cross sections A-A' and C-C'. FIG. 2J includes a periodic gap 224 in coaxial ground electrode 220, which is open adjacent to attachment points 222 and which is closed at cross section C-C'. A periodic gap 224, rather than a gap 224 that is continuous along coaxial electrode structure 200, may improve structural resilience of coaxial electrode structure 200 and modulation efficiency, and may reduce RF loss. However, a gap 224 that is continuous along coaxial electrode structure 200 may be simpler to fabricate than a periodic gap 224. In some embodiments, gaps 224 may also be spaced at irregular intervals. Gaps 224 may be referred to as being "closed" in cross sections wherein gap 224 does not exist, such as cross section C-C'.

FIG. 2K is a plan view of yet another embodiment of coaxial electrode structure 200 showing cutting planes corresponding to cross sections A-A' and D-D'. FIG. 2K includes a continuous gap 224 and periodic attachment points 222. For example, FIG. 2K may correspond to FIG. 2E, which shows gap 224, and which shows waveguide signal electrode 208 detached from coaxial signal electrode 218. Coaxial electrode structure 200 as shown in FIG. 2K may improve grounding, which reduces RF loss and improves modulation performance. In some embodiments, attachment points 222 may also be spaced at irregular intervals.

In some implementations, coefficients of thermal expansion may be different between coaxial electrode structure 200 and the waveguide electrode structure due to differences in materials of the two electrode structures. A material to provide compliance (e.g., stiffness) may be used at attachment points 222 shown in FIGS. 2A-2K. An intermediate metal material like indium or another metallic or dielectric structure that has some compliance may be used at attachment point 222. Such compliant structures may be easier to incorporate in a design with periodic attachment points 222, such as the example implementations shown in FIGS. 2J and 2K. If a dielectric layer is used at the attachment points 222, then the dielectric layer may have a thickness of less than approximately 1 micron, to improve (e.g., maximize) conductive coupling between coaxial electrode structure 200 and the waveguide electrode structure.

In this way, coaxial electrode structure 200 reduces RF loss and improves modulation efficiency of a modulator with a waveguide electrode structure, such as waveguide electrode structure 100 described in connection with FIG. 1. By reducing RF loss and improving modulation efficiency, coaxial electrode structure 200 may increase bandwidth, as well as reduce drive voltage requirements and/or size or length requirements of coaxial electrode structure 200.

As indicated above, FIGS. 2A-2K are provided merely as examples. Other examples are possible and may differ from what was described with regard to FIGS. 2A-2K.

Figure 3A:
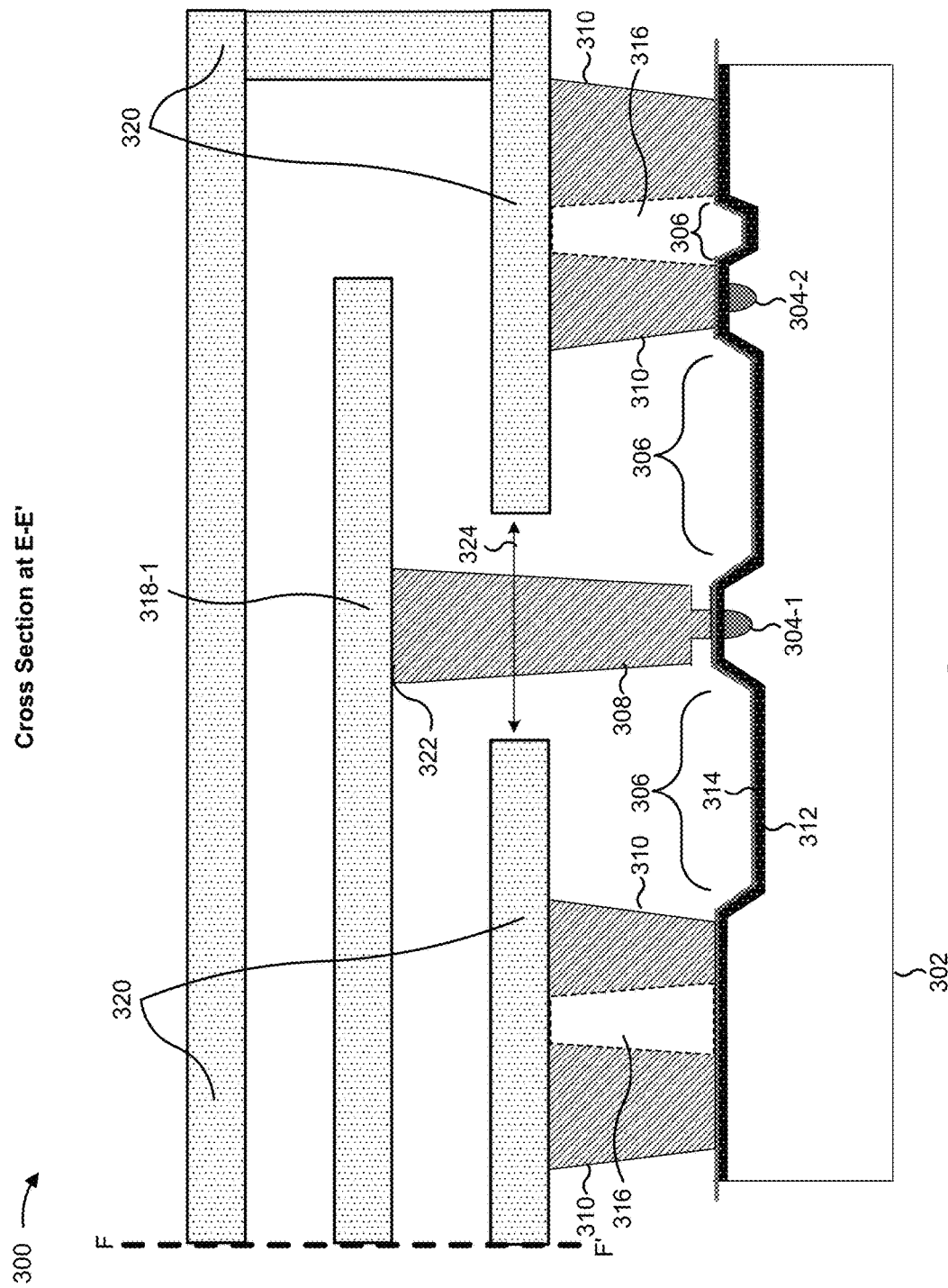
FIGS. 3A and 3B are diagrams of a cross section and a plan view of an example implementation of a coaxial electrode structure to be implemented with a waveguide electrode structure.
Figure 3B:
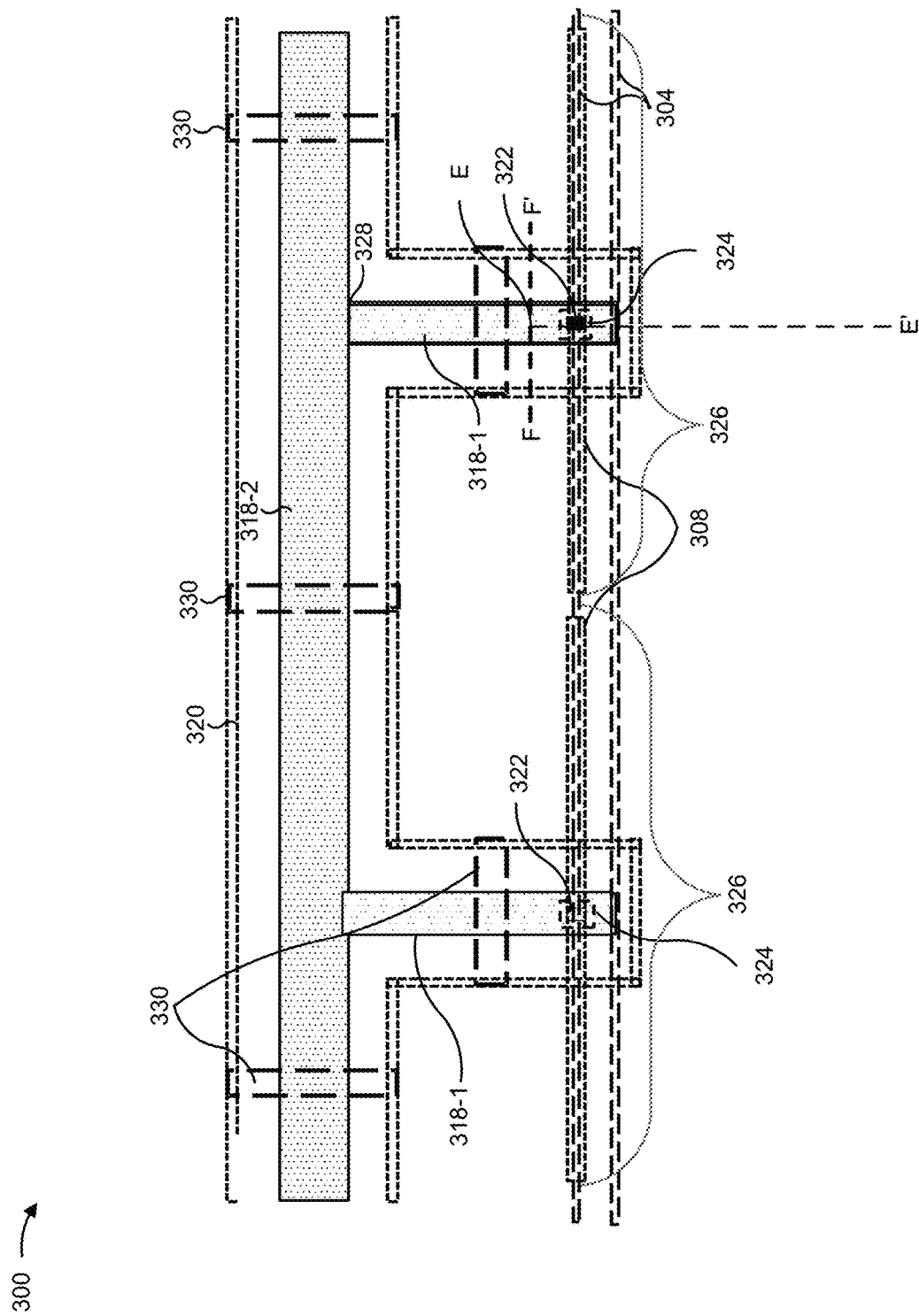

FIGS. 3A and 3B show a cross section E-E' and a plan view of an example implementation of a coaxial electrode structure 300 to be implemented with a periodic waveguide electrode structure. FIG. 3A shows a diagram at cross section E-E', which is shown in FIG. 3B. As shown in FIG. 3A, the waveguide electrode structure includes active substrate 302, waveguides 304 (shown as waveguide 304-1 and waveguide 304-2), substrate slots 306, waveguide signal electrode 308, waveguide ground electrode 310, buffer layer 312, bleed layer 314, and stress slot 316. Active substrate 302, waveguides 304, substrate slots 306, waveguide signal electrode 308, waveguide ground electrode 310, buffer layer 312, bleed layer 314, and stress slot 316 may be fabricated using the materials described with regard to the corresponding components of waveguide electrode structure 100, as described in connection with FIG. 1, using any reasonable fabrication method known in the art. Unlike FIG. 1, the waveguide signal electrode 308 and the waveguide ground electrode 310 are designed such that the signal electrode 308 may have a greater height than the ground electrodes 310. As further shown, coaxial electrode structure 300 includes coaxial signal electrode 318-1 and coaxial ground electrode 320, which may be fabricated using the materials described with regard to the corresponding components of coaxial electrode structure 200, as described in connection with FIGS. 2A-2K, using any reasonable fabrication method known in the art. Coaxial signal electrode 318-2 is shown in FIG. 3B.

As shown, coaxial signal electrode 318-1 is attached to waveguide signal electrode 308 at attachment point 322, and waveguide signal electrode 308 extends through gap 324 to attach to coaxial signal electrode 318-1. As further shown, the diagram of coaxial signal electrode 318-1 and coaxial ground electrode 320 ends at cross section F-F', which is shown in FIG. 3B.

FIG. 3B is a plan view of coaxial electrode structure 300, shown in FIG. 3A. Note that a cutting plane for cross section E-E' is orthogonal to the periodic waveguide electrode structures 326, and that the cutting plane for cross section E-E' is parallel to coaxial signal electrode 318-1, shown in FIG. 3A and ends before the dielectric bridge 330. As further shown, the cutting plane for cross section F-F' is orthogonal to coaxial signal electrode 318-1. As shown by reference number 328, coaxial signal electrode 318-1 extends from and/or is attached to coaxial signal electrode 318-2, which is wider than coaxial signal electrode 318-1. The width of coaxial signal electrode 318-1 is reduced relative to the width of coaxial signal electrode 318-2, which may reduce the capacitive loading of coaxial signal electrode 318-1. In some implementations, a ratio of the width of coaxial signal electrode 318-1 to the width of coaxial signal electrode 318-2 may be approximately 30% or in a range of approximately 10% to 50%. Dielectric bridges 330 are similar to dielectric bridges 240.

As further shown by reference number 326, the waveguide electrode structure is not continuous along a longitudinal axis of the waveguide electrode structure, and/or may be periodic along the longitudinal axis. As further shown, a different waveguide electrode structure may be used in connection with each coaxial signal electrode 318-1. For example, a length of each waveguide electrode structure 326 may be approximately 300 microns or in a range of approximately 100 to 600 microns, which may reduce low-pass or notch filter effects created by the periodic waveguide electrode structure. In some implementations, the spacing of the waveguide electrode structure sections may be aperiodic to suppress low-pass filter effects, or to enhance high-pass filter effects, in a case where frequency response shaping is desired.

As indicated above, FIGS. 3A and 3B are provided merely as examples. Other examples are possible and may differ from what was described with regard to FIGS. 3A and 3B.

Figure 4:
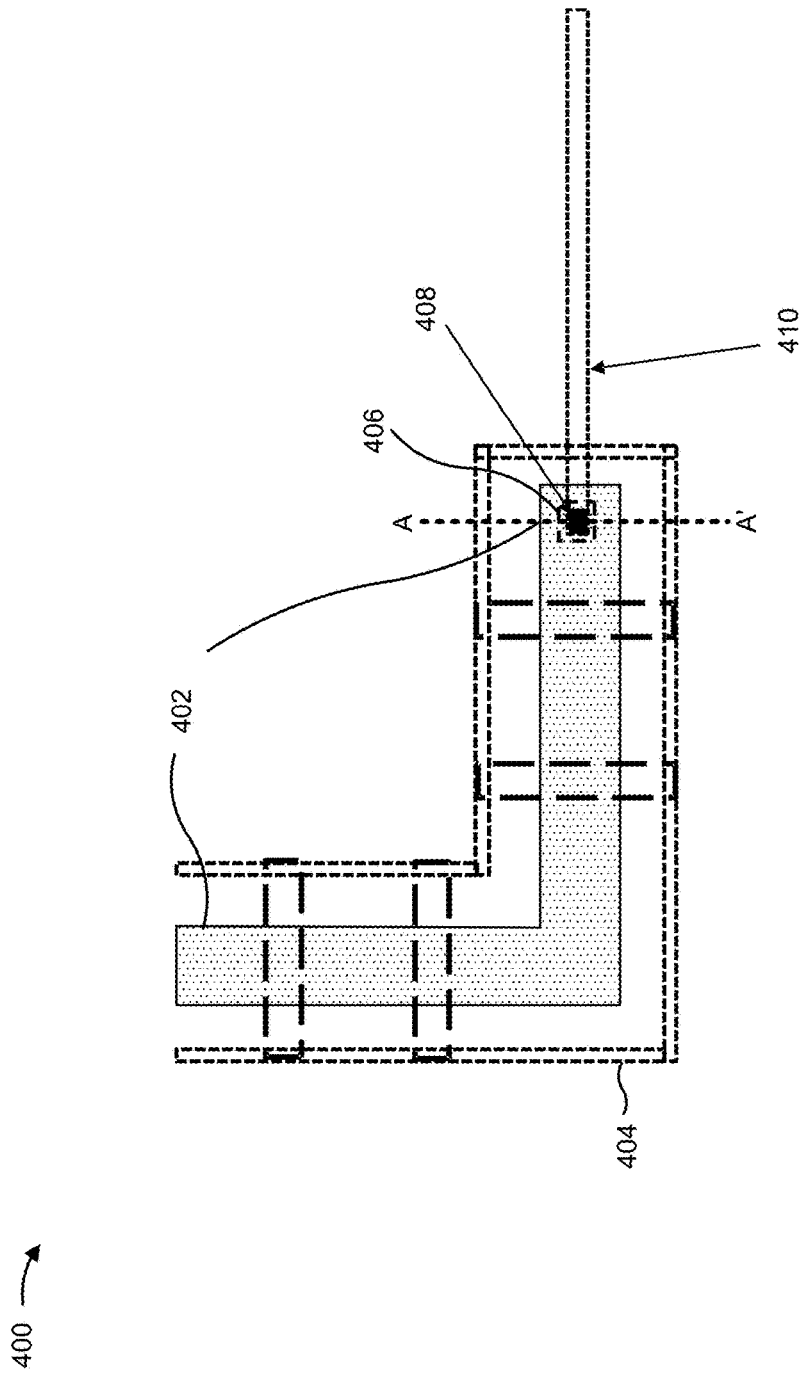
FIG. 4 is a diagram of a plan view of an example implementation of a coaxial electrode structure to be implemented with a waveguide electrode structure.

FIG. 4 is an example implementation of a coaxial electrode structure 400 to be implemented with a waveguide electrode structure. As shown, coaxial electrode structure 400 includes coaxial signal electrode 402, coaxial ground electrode 404, gap 406, attachment point 408, and waveguide signal electrode 410, which include the components described with regard to coaxial signal electrode 218, coaxial ground electrode 220, gap 224, attachment point 222, and waveguide signal electrode 208, respectively.

As shown, coaxial electrode structure 400 may correspond to cross section A-A', shown in FIG. 2A. As further shown, coaxial signal electrode 402 and coaxial ground electrode 404 extend to and/or past cross section A-A'. As further shown, gap 406 is included in coaxial ground electrode 404, and coaxial signal electrode 402 is attached to waveguide signal electrode 410 at attachment point 408. Coaxial electrode structure 400 may be simpler to fabricate than a coaxial electrode structure with multiple attachment points, such as coaxial electrode structure 300, described in connection with FIGS. 3A and 3B.

As indicated above, FIG. 4 is provided merely as an example. Other examples are possible and may differ from what was described with regard to FIG. 4.

Figure 5B:
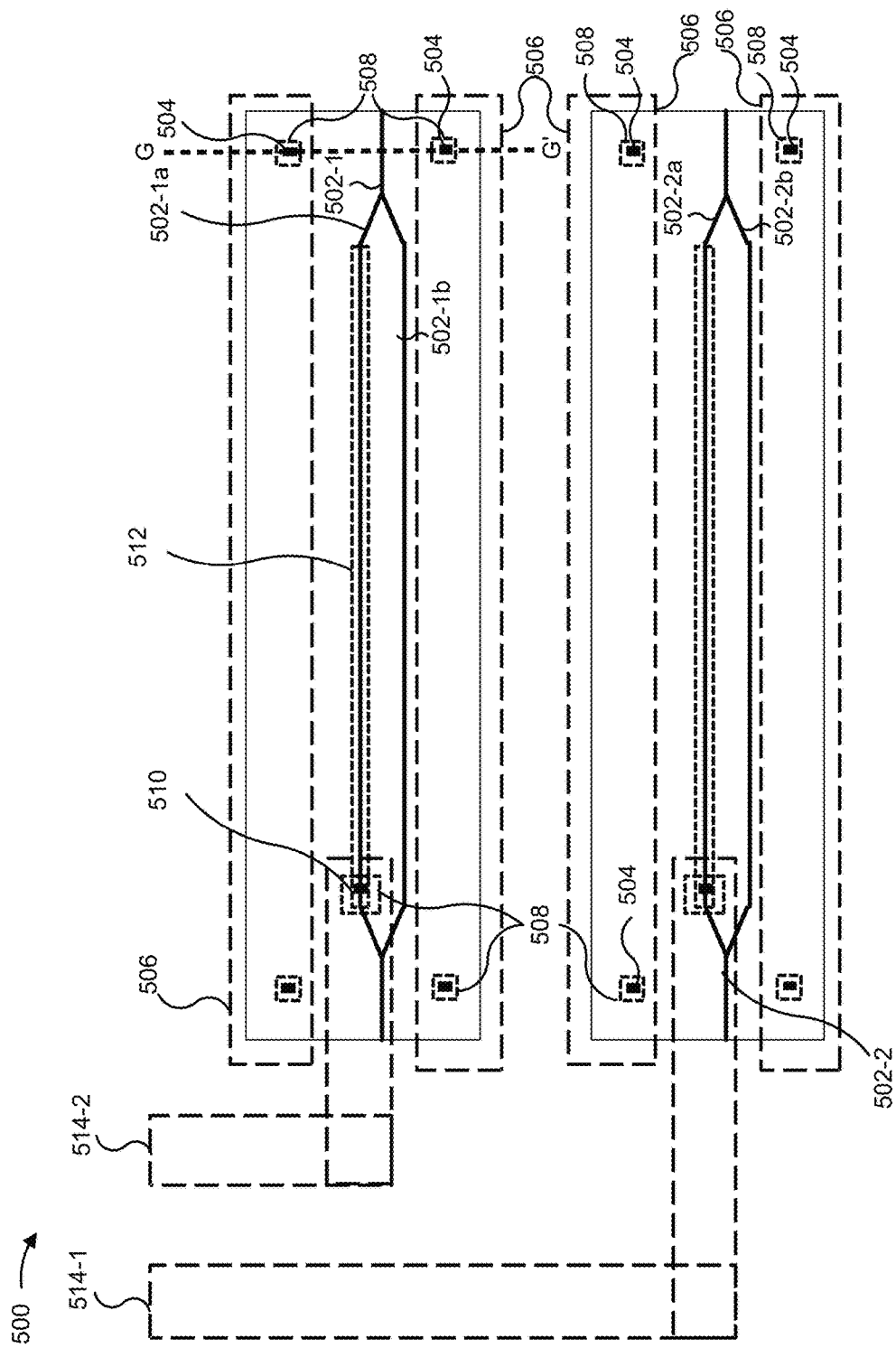

FIGS. 5A and 5B are diagrams of a cross section G-G' and a plan view of an example implementation that shows a coaxial electrode structure 500 some of which is capable of transmitting RF signals to multiple waveguide electrode structures which may be associated with one or more electro-optical modulators. The cross section illustrated in FIG. 5A corresponds to the line G-G' shown in FIG. 5B. Coaxial electrode structure 500 may be attached to the corresponding waveguide electrode structures using a flip chip, or controlled collapse chip, attachment method. For example, as shown in FIG. 5A, a waveguide electrode structure (i.e., an electrode structure attached to an active substrate that includes waveguide 502-1) may include alignment electrodes 504. Alignment electrodes 504 may include the materials described in connection with signal electrode 120 and/or ground electrode 125, and may be fabricated when signal electrode 120 and/or ground electrode 125 are fabricated. Alignment electrodes 504 may be used to align coaxial electrode structure 500 with the waveguide electrode structure.

As shown, the waveguide electrode structure may be mounted to coaxial electrode structure 500 by aligning coaxial support electrode 506 with alignment electrode 504 via slot 508, and by bonding coaxial support electrode 506 with the waveguide electrode structure (e.g., using compression boding, epoxy, soldering, etc.). Coaxial support electrode 506 may be included in coaxial electrode structure 500, and may be fabricated using methods and/or material used to fabricate coaxial signal electrode 218 and/or coaxial ground electrode 220. Coaxial support electrode 506 may be used to align coaxial electrode structure 500 with the waveguide electrode structure, and to support the waveguide electrode structure. That is, in some implementations, coaxial support electrode 506 may not perform the signal transmission or grounding functions to be performed by coaxial signal electrode 218 and coaxial ground electrode 220, respectively. Coaxial support electrode 506 may not include dielectric bridges or coaxial signal electrodes for simplicity of manufacturing.

As shown in FIG. 5B, the cutting plane corresponding to cross section G-G' passes through alignment electrodes 504, coaxial support electrodes 506, and slots 508. As further shown, waveguide 502-1, shown in FIG. 5A, splits into waveguides 502-1a and 502-1b. As further shown, coaxial electrode structure 500 is attached to waveguide signal electrode 512 (e.g., corresponding to waveguide signal electrode 120 of FIG. 1) at attachment point 510 (e.g., corresponding to attachment point 222 of FIG. 2A). For example, a coaxial signal electrode of coaxial electrode structure 500 (not shown) may be attached to waveguide signal electrode 512 at attachment point 510.

As shown, coaxial electrode structure 500 includes RF inputs 514-1 and 514-2, which are connected with waveguides 502-1 and 502-2, respectively. RF inputs 514-1 and 514-2 carry RF signals to be transmitted down waveguide signal electrode 512 and a coaxial signal electrode of coaxial electrode structure 500. RF inputs 514-1 or 514-2 may correspond to the structures described and illustrated in FIG. 4.

As indicated above, FIGS. 5A and 5B are provided merely as examples. Other examples are possible and may differ from what was described with regard to FIGS. 5A and 5B.

Figure 6A:
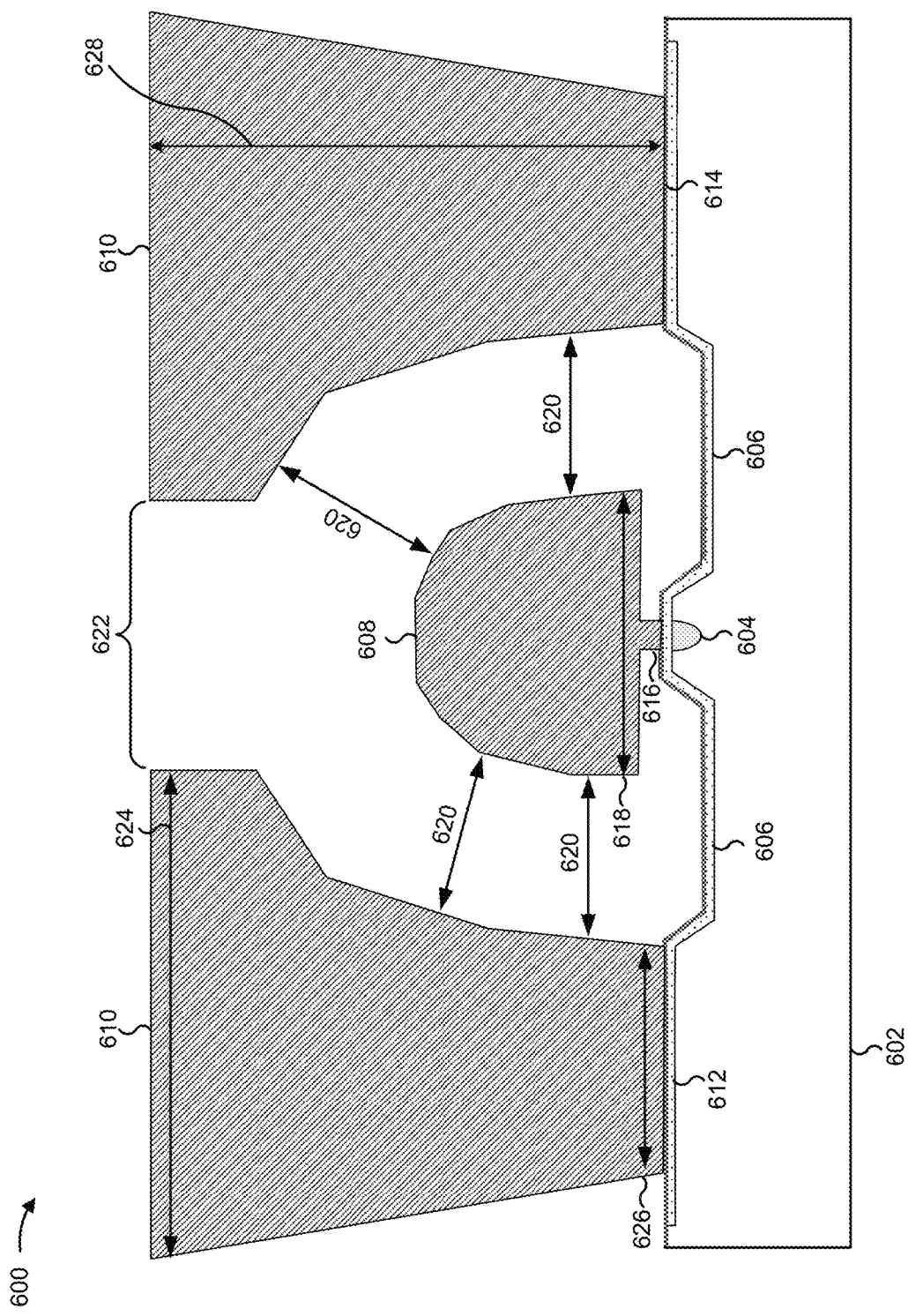

FIGS. 6A-6I are diagrams of cross sections of an example implementation of a ground-enclosure electrode 600. As shown in FIG. 6A, ground-enclosure electrode 600 includes active substrate 602, waveguide 604, substrate slot 606, signal electrode 608, ground electrode 610, buffer layer 612, and bleed layer 614. Active substrate 602, waveguide 604, substrate slot 606, signal electrode 608, ground electrode 610, buffer layer 612, and bleed layer 614 may be fabricated using the materials described with regard to the corresponding components of waveguide electrode structure 100 using any reasonable fabrication method known in the art. In particular, the rounded shape of electrodes 608 and 610 can be approximated as a staircase shape created by multiple lithographic and electroplating steps performed one after the other. In some implementations, ground-enclosure electrode 600 may include two waveguides 604, as described in more detail in connection with waveguides 110-1 and 110-2 in FIG. 1, which may improve modulation efficiency of ground-enclosure electrode 600.

As shown in FIG. 6A, signal electrode 608 may have a curved outer surface, which improves distribution of charge on a surface of signal electrode 608 and which reduces RF loss associated with charge clustering. In some implementations, signal electrode 608 may be cylindrical, semi-cylindrical, or the like. A cylindrical signal electrode 608 may further reduce RF loss and improve modulation efficiency of ground-enclosure electrode 600, whereas a semi-cylindrical signal electrode 608 may be simpler to fabricate than a cylindrical signal electrode 608. In some implementations, signal electrode 608 may have a different cross-sectional shape than what is shown in FIG. 6A, such as a shape that tapers to a decreased width as a distance from waveguide 604 increases, a rectangle, a triangle, a trapezoid, or the like. In some implementations, signal electrode 608 and ground electrode 610 take on shapes to reduce the number of acute corners, maintain a substantially consistent gap between signal electrode 608 and ground electrode 610, and substantially or partially enclose the signal electrode 608 with ground electrode 610.

In some implementations, signal electrode 608 may have a width at a base 616 of signal electrode 608 (i.e., the portion of signal electrode 608 that is adjacent to waveguide 604) of approximately 6 microns or in a range from approximately 5 to 10 microns. In some implementations, signal electrode 608 may have a height at base 616 of approximately 10 microns or in a range from approximately 2 to 15 microns. In some implementations, signal electrode 608 may have a width, at cross section 618, of approximately 30 microns or in a range from approximately 10 to 50 microns. In some implementations, signal electrode 608 may have a height (e.g., from base 616 to a top of signal electrode 608) of approximately 50 microns or in a range from approximately 10 to 100 microns.

As further shown in FIG. 6A, ground electrode 610 partially encloses signal electrode 608. Furthermore, the inner surface of ground electrode 610 (i.e., the surface facing the outer surface of signal electrode 608) may be fabricated with an inward slope or may curve toward signal electrode 608. In this way, consistency of the gap length between the curved outer surface of signal electrode 608 and a curved inner surface of ground electrode 610 (i.e., gap 150 in FIG. 1) is improved. For example, each of the gap lengths in the radial direction, shown by reference number 620, are approximately equal, which reduces RF loss due to charge clustering and improves modulation efficiency of ground-enclosure electrode 600. In some implementations, gap length 620 may be approximately 50 microns or in a range from approximately 20 to 100 microns.

As shown by reference number 622, ground-enclosure electrode 600 includes an opening, referred to herein as an electrode gap, which may simplify fabrication of ground-enclosure electrode 600 (e.g., by permitting removal of a photoresist in a lithographic process, by requiring fewer lithographic placement steps in a lithographic process, etc.). In some implementations, electrode gap 622 may have a width of approximately 20 microns or in a range from approximately 10 to 50 microns and/or a cross-sectional area of approximately 200 square microns or in a range from approximately 100 to 500 square microns. In some implementations, when ground electrode 610 includes electrode gap 622, a top surface of ground electrode 610 may have a width 624 of approximately 100 microns or in a range from approximately 50 to 200 microns, or may have a width 624 that is 200% of, or in a range from approximately 150% to 500% of, a width 626 of a base of ground electrode 610. Width 626 may be approximately 50 microns or in a range from approximately 25 to 100 microns. In some implementations, ground electrode 610 may have a height of approximately 60 microns or in a range from approximately 30 to 100 microns.

In some implementations, ground electrode 610, along with active substrate 602, may at least substantially enclose (e.g., 75%, 80%, 95%, 100%) an outer surface of signal electrode 608 along a longitudinal axis of ground-enclosure electrode 600. For example, an inner surface of ground electrode 610 may include electrode gap 622 which causes the outer surface of signal electrode 608 to be less than fully enclosed along the longitudinal axis of ground-enclosure electrode 600. In some implementations, a ratio of a surface area of the curved inner surface with electrode gap 622 to a surface area of the curved inner surface without electrode gap 622 may be approximately 75%, 80%, 95%, 100%, or the like.

Figure 6B:
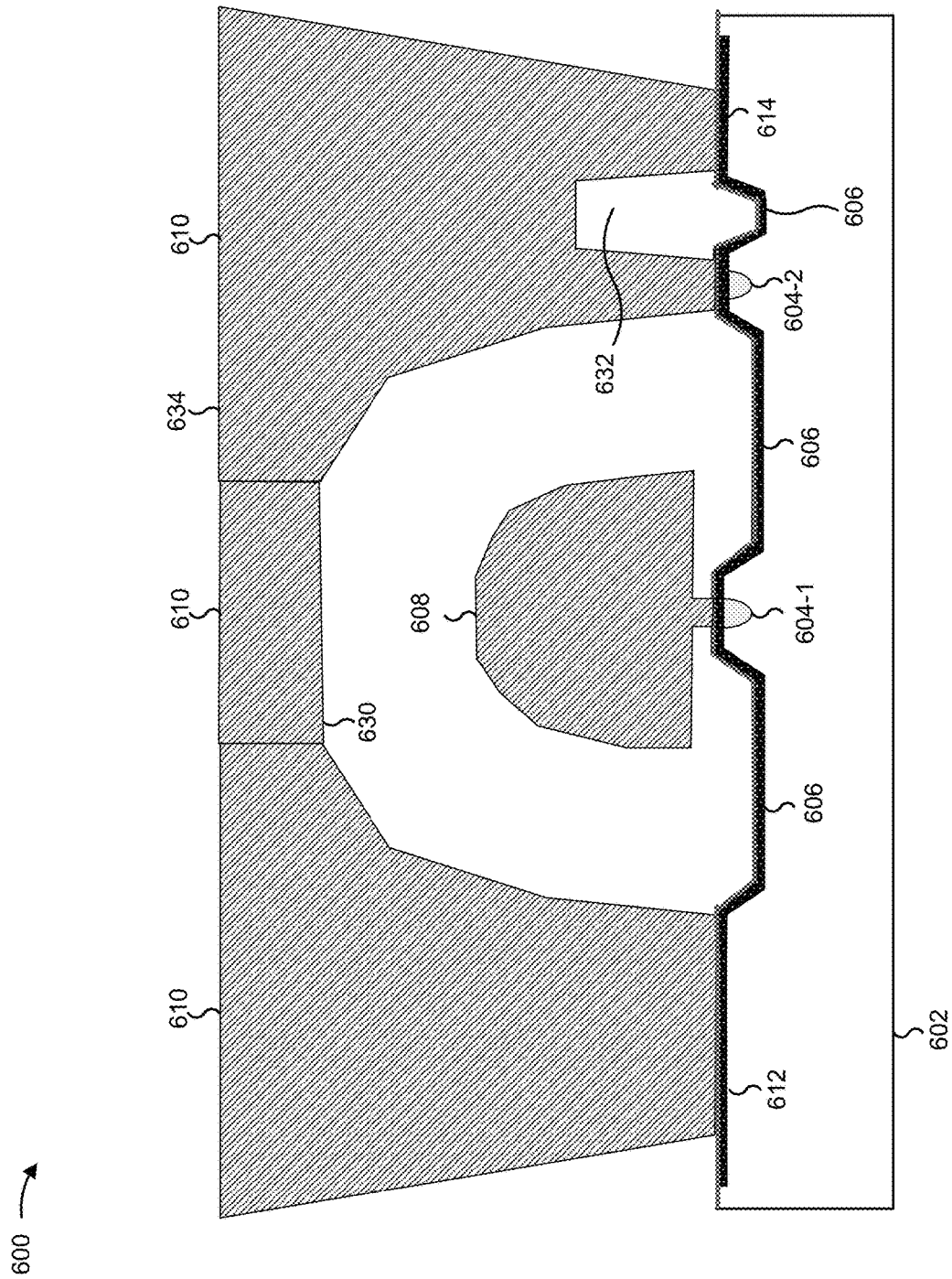

As shown in FIG. 6B, and by reference number 630, in some implementations, signal electrode 608 is completely enclosed by ground electrode 610 and active substrate 602, which may reduce RF loss and improve modulation efficiency of signal electrode 608. In some implementations, at different cross sections of ground-enclosure electrode 600, ground electrode 610 may completely enclose signal electrode 608, as in FIG. 6B, and at other cross sections of ground-enclosure electrode 600, ground electrode 610 may partially or substantially enclose signal electrode 608, as in FIG. 6A. For example, electrode gap 622 may be spaced periodically or non-periodically along ground-enclosure electrode 600, which permits removal of a photoresist and/or other materials used in construction of ground-enclosure electrode 600. This may provide some of, or all of, the benefits described in connection with reference number 630 of FIG. 6B, while simplifying fabrication of ground-enclosure electrode 600.

As further shown in FIG. 6B, in some implementations, ground-enclosure electrode 600 includes buried slot 632. Buried slot 632 is a gap in ground electrode 610 to mitigate stress caused by thermal expansion due to change in ambient temperature of waveguides 604-1 and 604-2, signal electrode 608, and/or ground electrodes 610. Here, buried slot 632 does not continue through ground-enclosure electrode 600 to upper surface 634, which reduces RF loss as compared to a stress slot that continues to upper surface 634. In some implementations, buried slot 632 may continue to upper surface 634, which simplifies fabrication of ground-enclosure electrode 600 by eliminating the need for a slot opening to an outer surface of ground electrode 610 other than upper surface 634.

Figure 6C:
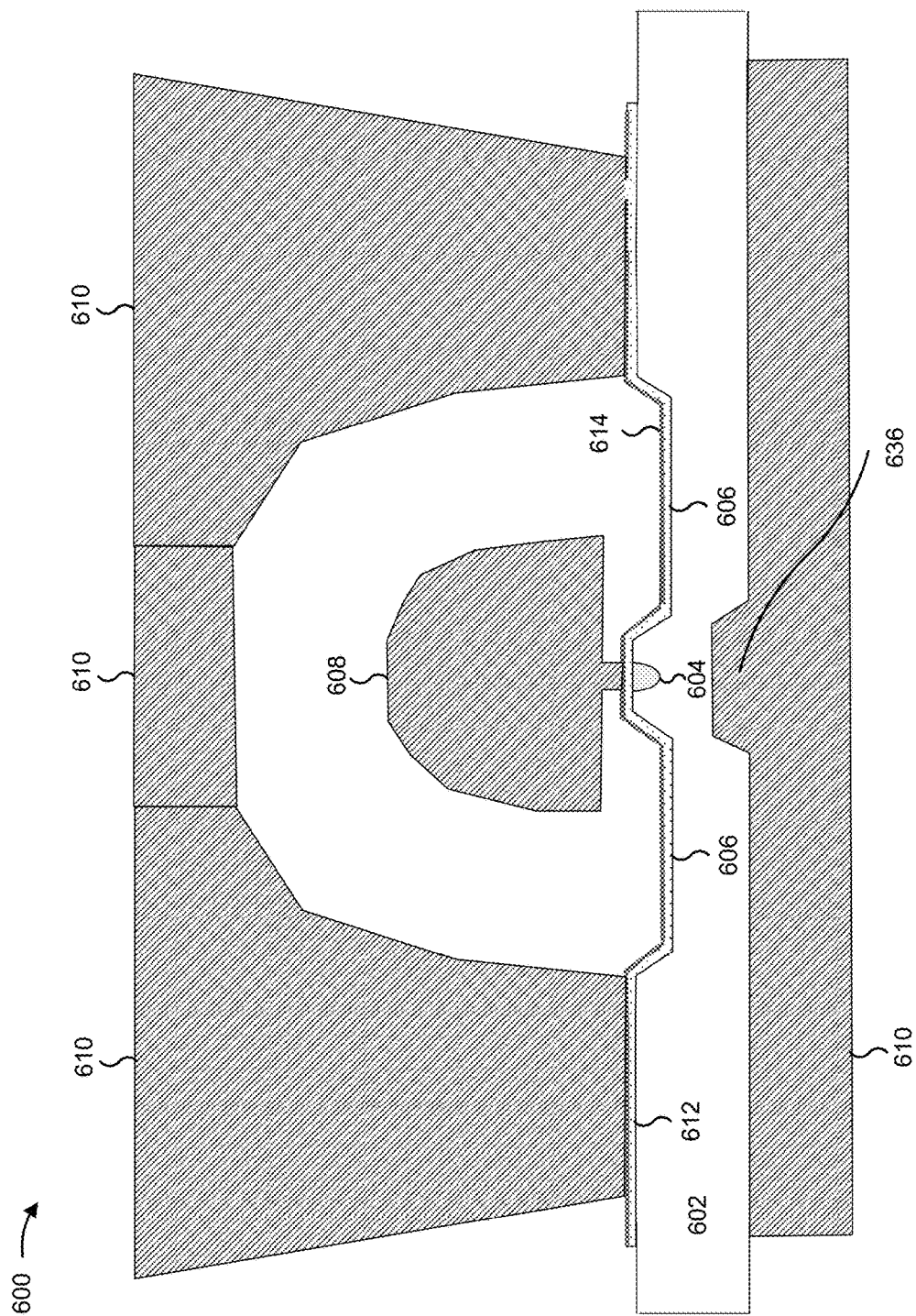

As shown in FIG. 6C, in some implementations, a layer of ground electrode 610 may be affixed to a lower surface of active substrate 602 (i.e., a surface opposite from a surface to which signal electrode 608 is attached), which improves RF charge distribution and therefore reduces RF loss. As further shown, in some implementations, when ground electrode 610 is affixed to the lower surface of active substrate 602, ground electrode 610 may include a substrate ridge 636, which may focus RF signals on waveguide 604, thereby improving modulation efficiency.

Figure 6D:
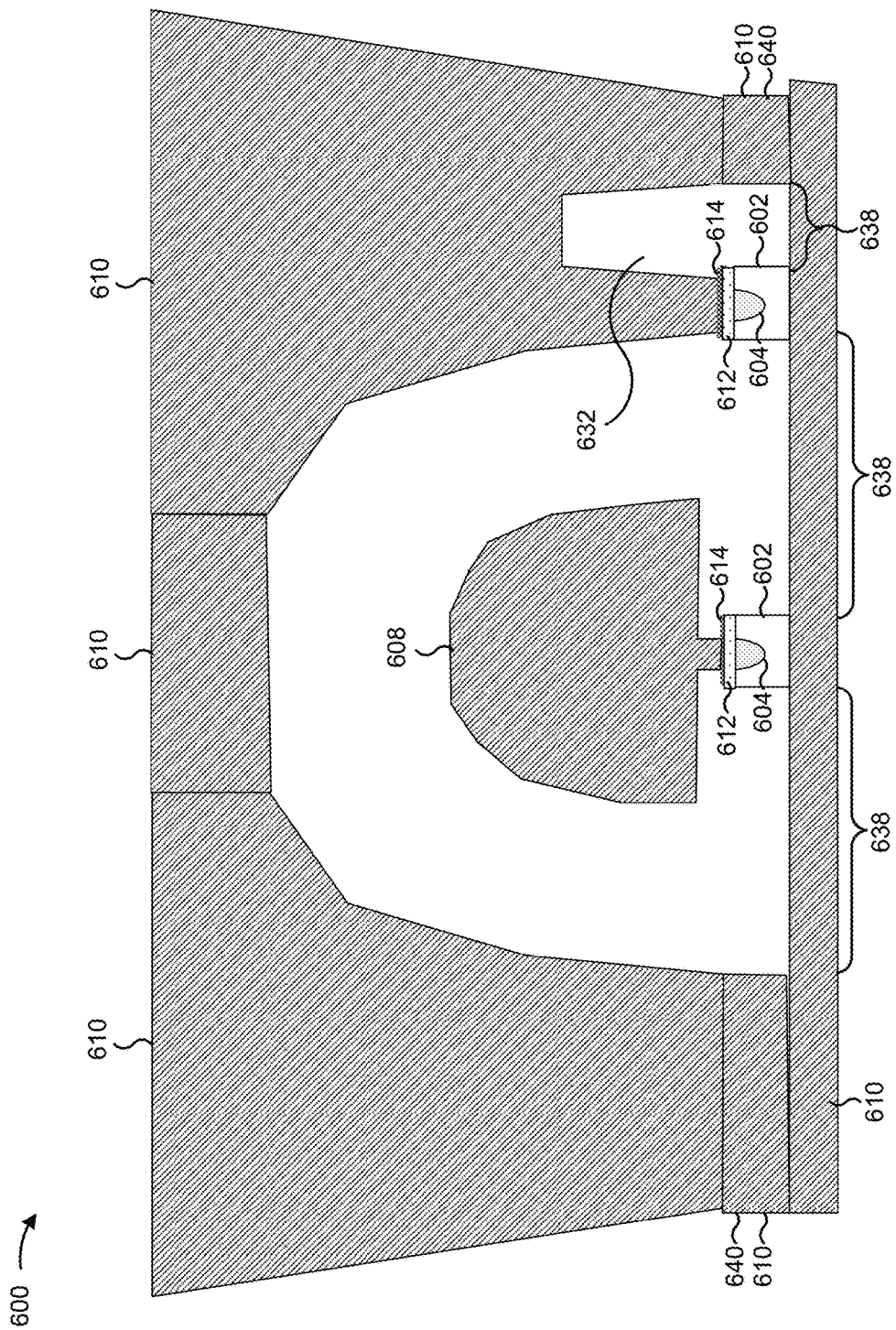

As shown in FIG. 6D, in some implementations, active substrate 602 may be removed from areas 638 not adjacent to waveguides 604 (e.g., areas more than a particular distance from waveguide 604, areas that are not underneath signal electrode 608 or ground electrode 610, etc.), which concentrates optical and RF fields, thereby enhancing overlap and reducing capacitance due to active substrate being present in areas not having a waveguide 604. In this way, ground-enclosure electrode 600 improves modulation efficiency while maintaining electrode impedance and a microwave propagation index to cause efficient transfer of RF power to the electrode and matching of optical and microwave velocities. As further shown, in some implementations, ground electrode 610 may be placed at locations 640 such that signal electrode 608 and active substrate 602 are completely enclosed by ground electrode 610, thereby reducing RF loss.

Figure 6E:
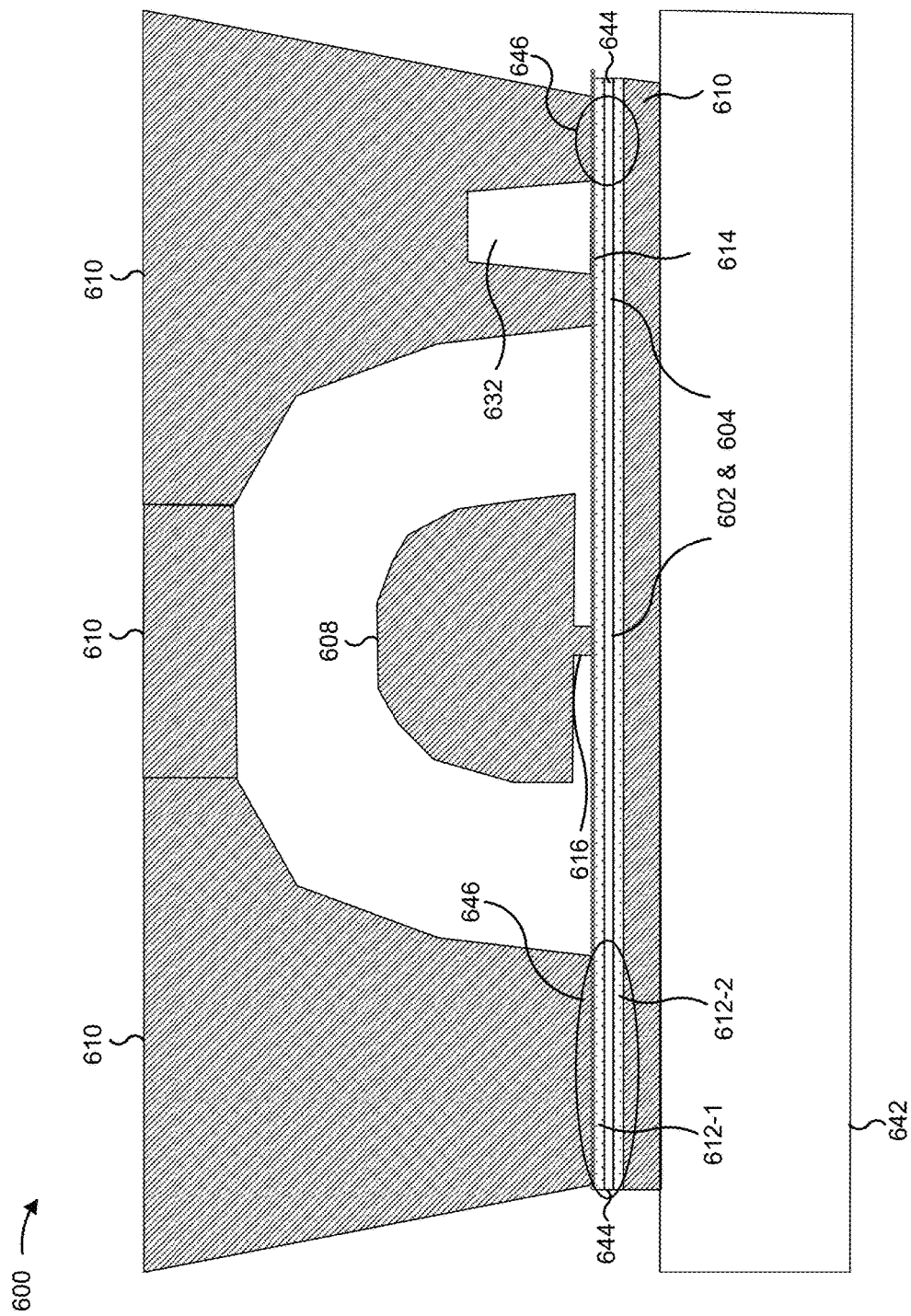

FIG. 6E is a diagram of ground-enclosure electrode 600 with an active substrate 602 that is partially or completely enclosed by ground electrode 610. In FIG. 6E, active substrate 602 may be a thin substrate having a thickness of approximately 1 micron or in a range between approximately 0.01 microns and 10 microns, as described in more detail in connection with FIGS. 2F-2H, above. Active substrate 602 and/or waveguides 604 in active substrate 602 may be fabricated using the materials and/or measurements described in connection with FIGS. 2F-2H. Waveguides 604 (not explicitly shown) may be located under signal electrode 608 and under ground electrode 610 (e.g., adjacent to base 616 of signal electrode 608 and adjacent to buried slot 632, respectively). As further shown, support substrate 642 may be affixed to ground electrode 610. Support substrate 642 may provide structural support for ground electrode 610 or active substrate 602, and may be fabricated using silicon, alumina, or the like.

As further shown in FIG. 6E, ground electrode 610 may substantially or completely enclose signal electrode 608. Here, ground electrode 610 substantially encloses signal electrode 608 and active substrate 602 with the exception of the sides of active substrate 602 shown by reference numbers 644. In some implementations, ground electrode 610 may completely enclose signal electrode 608. For example, the areas shown by reference numbers 646 may be filled by ground electrode 610. In such a case, active substrate 602, buffer layer 612, and/or bleed layer 614 may be etched to remove portions of active substrate 602, buffer layer 612, and/or bleed layer 614 that are not adjacent to waveguides 604, similarly to the example implementation shown in FIG. 6D. Additionally, or alternatively, portions of active substrate 602, buffer layer 612, and/or bleed layer 614 that are not located under signal electrode 608 or ground electrode 610 may be removed, which may reduce RF loss and improve modulation efficiency.

The curved geometry of surfaces of electrodes 608 and 610 may be fabricated, for example, by multiple rounds of photolithography and electroplating, where openings are patterned in a layer of photoresist, then gold or copper electrodes are plated up through the openings. The openings for signal electrode 608 may be smaller and smaller with each successive lithographic step, while the openings for ground electrode 610 may be larger and larger. It may be necessary to hard bake the photoresist at some of the lithographic steps, to keep the photoresist from being patterned and removed by subsequent lithographic steps. The last electroplating step may allow metal for ground electrode 610 to plate horizontally as well as vertically, to allow the left and right ground electrodes 610 to become connected at the top. The photoresist left temporarily underneath the ground electrodes 610 would allow the ground electrodes 610 on each side of signal electrode 608 to merge above the signal electrode 608, while maintaining a defined RF gap. After all lithographic steps are complete, the photoresist is removed by solvents entering the slots at the top and side of ground electrodes 610 (e.g., at a slot opening to buried slot 632 and electrode gap 622). Seed layer metals needed for electroplating are removed by etchants entering the same slots.

FIGS. 6F and 6G are diagrams of example designs of waveguide 604 and surrounding electrodes and substrates when active substrate 602 is an ultra-thin substrate (e.g., as shown in FIG. 6E). As shown in FIG. 6F, in some implementations, active substrate 602 is substantially or completely removed from ground-enclosure electrode 600 with the exception of waveguide 604 (e.g., by etching, buffing, etc.), a buffer layer 612-1 is placed between signal electrode 608 and waveguide 604, and a buffer layer 612-2 is placed between waveguide 604 and ground electrode 610. Buffer layer 612-1 may function as a top cladding layer for waveguide 604. In FIGS. 6F-I, enlarged views of the area surrounding base 616 are illustrated.

Buffer layer 612-2 may reduce interaction between active substrate 602 and the layer of ground electrode 610 that is provided adjacent to support substrate 642. In some implementations, buffer layer 612-2 may not be included in ground-enclosure electrode 600, which may simplify fabrication of ground-enclosure electrode 600.

As further shown, signal electrode 608 may include a channel adjacent to waveguide 604, which may improve modulation efficiency of signal electrode 608 by horizontally confining optical signals in waveguide 604. In some implementations, the design shown in FIG. 6F may have relatively strong horizontal confinement (e.g., relatively strong as compared to the example implementation to be described in connection with FIG. 6G, below). The relatively strong horizontal confinement may cause waveguide 604 to be multimode, which may lead to mode conversion between optical modes, reduced modulation efficiency, increased optical loss, and/or reduced contrast between on and off intensities for ground-enclosure electrode 600 as compared to a single-mode waveguide 604.

As shown in FIG. 6G, in some implementations, active substrate 602 may be partially etched or otherwise removed to a lesser degree than in the implementation shown in FIG. 6F. In this way, a rib waveguide 604 with a height 648 of approximately 0.5 micrometers to 5 micrometers may be created. As further shown, buffer layer 612-3, which may include silicon dioxide, Benzocyclobutene, or the like, may be deposited on buffer layer 612-1 and/or bleed layer 614, which may improve efficiency by concentrating a waveform of the RF field in waveguide 604. The design shown in FIG. 6G may have less horizontal optical confinement than the design shown in FIG. 6F, which may simplify design of waveguide 604 to be a single-mode waveguide.

Figure 6H:
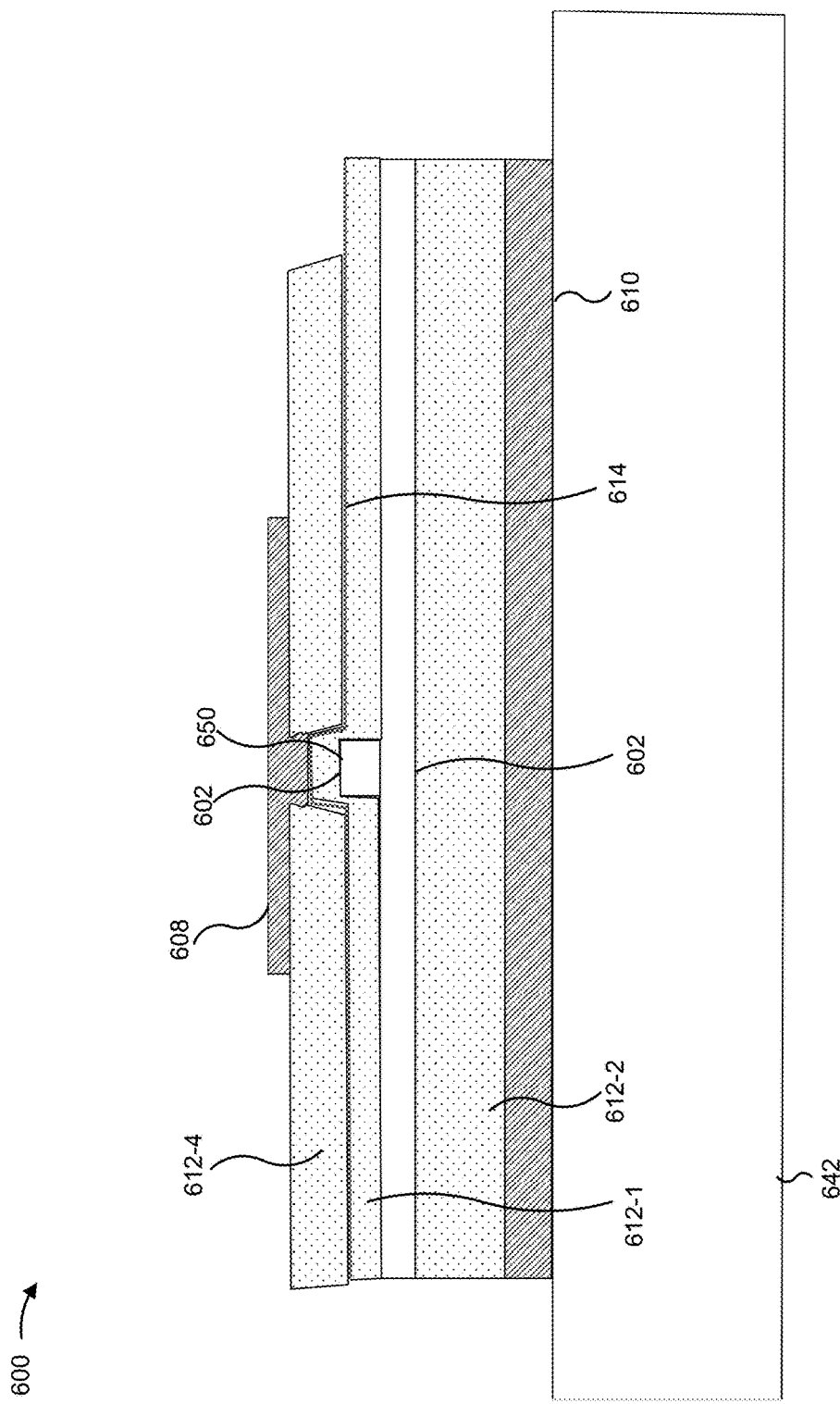

FIG. 6H shows yet another example implementation of ground-enclosure electrode 600. The design shown in FIG. 6H may reduce field flux in regions outside of waveguide 604 by introducing a buffer layer 612-4 above active substrate 602. Buffer layer 612-1 (e.g., silicon dioxide, etc.) may be deposited on active substrate 602 and waveguide 604. Bleed layer 614 may be deposited on top of buffer layer 612-1. Another buffer layer 612-4 (e.g., silicon dioxide, a polymer such as Benzocyclobutene, or the like) is deposited on bleed layer 614, then etched to provide a slot 650 into which a portion of signal electrode 608 may extend. Buffer layers 612-1 and 612-4 may reduce the field flux in regions outside of waveguide 604. The portion of signal electrode 608 that extends into the slot in buffer layer 612-4 may be formed by electroplating, sputtering metal, or the like.

Figure 6I:
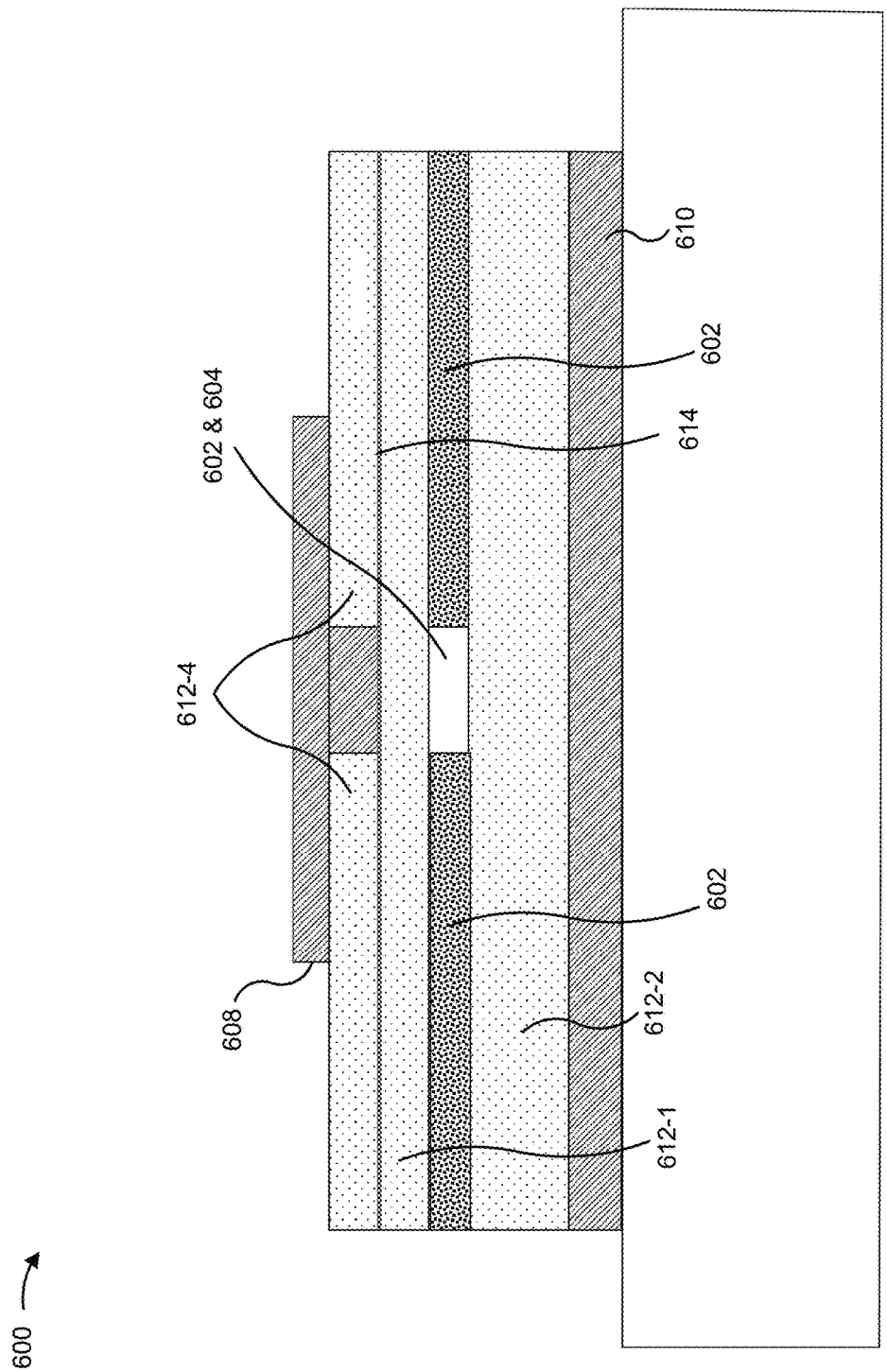

FIG. 6I shows another example implementation of ground-enclosure electrode 600 incorporating photonic crystals in active substrate 602. As shown in FIG. 6I, in some implementations, active substrate 602 may include photonic crystals. The photonic crystal may be formed, for example, using a lattice of holes in active substrate 602, formed outside of waveguide 604. For example, the lattice of holes may be arranged in a hexagonal lattice, and the longitudinal axis of the holes may extend from buffer layer 612-1 to buffer layer 612-2.

Buffer layers 612-1 and 612-2 may reduce or eliminate optical metal loading of waveguide 604, and may provide a way to adjust both electrode impedance and microwave propagation index. For the design shown in FIG. 6I, bleed layer 614 is deposited on buffer layer 612-1 above active substrate 602. Buffer layer 612-4 (e.g., silicon dioxide, Benzocyclobutene, etc.) may be deposited on bleed layer 614, then buffer layer 612-4 may be etched to provide a slot through which signal electrode 608 protrudes, improving efficiency by concentrating the RF electric field to waveguide 604. The photonic crystal lattice not only provides optical confinement of the optical field, but RF confinement of the RF field, as the effective permittivity value of the photonic crystal region is reduced compared to bare active substrate 602.

As indicated above, FIGS. 6A-6I are provided merely as examples. Other examples are possible and may differ from what was described with regard to FIGS. 6A-6I.

The foregoing disclosure provides illustration and description, but is not intended to be exhaustive or to limit the implementations to the precise form disclosed. Modifications and variations are possible in light of the above disclosure or may be acquired from practice of the implementations.

In some implementations, described herein, a signal electrode may act as a ground electrode. For example, the signal electrode may have no alternating current or direct current bias, may have a negligible or small alternating current or direct current bias (e.g., negligible or small compared to a voltage of the modulation signal), or the like. In some implementations, the ground electrode may carry a modulation signal and/or may be associated with a negligible or small bias.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device comprising:
   a substrate;

an optical waveguide formed in or on the substrate;
a signal electrode extending along a longitudinal axis,
the signal electrode comprising:
  a first signal portion with a proximal end that is proximal to the optical waveguide, to induce a signal from the signal electrode to the optical waveguide, and
  a second signal portion, at least partially attached to or continuous with a distal end of the first signal portion; and
one or more ground electrodes that form an enclosure, the one or more ground electrodes comprising:
  first ground portions adjacent to the substrate and on opposite lateral sides of the first signal portion, and
  second ground portions, including a first portion and a second portion,
    the first signal portion extending through a gap between the first portion and the second portion,
    the second signal portion overlapping a portion of a length of the first portion and a portion of a length of the second portion, and
    the enclosure enclosing the signal electrode with regard to a side of the substrate in a plane perpendicular to the longitudinal axis.

2. The device of claim 1, where a part of the one or more ground electrodes extends into the enclosure between the second signal portion of the signal electrode and the substrate, and
where the device further comprises one or more gaps in the part; and
where the first signal portion of the signal electrode extends through at least one of the one or more gaps.

3. The device of claim 2, where the one or more gaps comprise a gap that is continuous along the longitudinal axis.

4. The device of claim 1, where a ground electrode, is provided adjacent to a surface of the substrate opposite a surface to which the signal electrode is proximate.

5. The device of claim 1, where the second signal portion of the signal electrode is supported by at least one of:
the first signal portion of the signal electrode, or
a dielectric material extending from a first surface of the one or more ground electrodes to a second surface of the one or more ground electrodes.

6. The device of claim 1, where the first signal portion of the signal electrode is attached to the second signal portion of the signal electrode at an interface,
the interface including a metallic or dielectric layer to increase compliance between the first signal portion and the second signal portion of the signal electrode.

7. The device of claim 1, where the one or more ground electrodes further comprise:
two first ground electrodes attached to the second ground portions, respectively,
  the two first ground electrodes extending away from a surface of the substrate, and extending further than the signal electrode, and
a second ground electrode formed between the two first ground electrodes toward a distal end of the two first ground electrodes.

8. A device comprising:
a substrate;
an optical waveguide formed in or on the substrate;
a signal electrode extending along a longitudinal axis, comprising:
  a first signal portion comprising a first end proximate to the optical waveguide to induce a signal from the signal electrode to the optical waveguide, and a second end distal from the optical waveguide, and
  a second signal portion at least partially connected to the second end of the first signal portion; and
a ground electrode comprising:
  first ground portions adjacent to the substrate and on opposite lateral sides of the first signal portion, and
  second ground portions, including a first portion and a second portion,
    the first signal portion extending through a gap between the first portion and the second portion, and
    the second signal portion overlapping a portion of a length of the first portion and a portion of a length of the second portion, and
  the ground electrode forming an enclosure that encloses the signal electrode with regard to the substrate.

9. The device of claim 8, where the first signal portion is periodically attached to the second signal portion along the longitudinal axis.

10. The device of claim 8, where the second signal portion is structurally supported by at least one of:
the first signal portion, or
a dielectric material, attached to the enclosure.

11. The device of claim 10, where
the gap is one of one or more gaps,
the one or more gaps are closed at a cross section of the device where the second signal portion is attached to the dielectric material, and
the one or more gaps are open at a cross section where the second signal portion is attached to the first signal portion.

12. The device of claim 8, where the second signal portion is formed separately from the first signal portion and subsequently attached to the first signal portion; and
where the second ground portions are formed separately from the first ground portions and subsequently attached to the first ground portions.

13. The device of claim 8, where the second signal portion defines two spaces on opposite sides of the first signal portion,
the spaces being situated between the second signal portion and the substrate; and
where the second ground portions include flanges that extend into the spaces.

14. The device of claim 8, where the optical waveguide is a first optical waveguide; and
where the device further comprises a second optical waveguide formed in or on the substrate,
  the second optical waveguide being proximate to a particular ground portion of the first ground portions and the second ground portions; and
where the particular ground portion comprises a slot, adjacent to the second optical waveguide and continuing at least partially to an outer surface of the particular ground portion.

15. The device of claim 8, where
the second signal portion is located a first distance from the substrate, and
the second ground portions are located a second distance from the substrate,
the first distance being greater than the second distance.

16. A device comprising:
a substrate;
an optical waveguide formed on or in the substrate; and
an electrode structure on the substrate extending along a longitudinal axis, the electrode structure comprising:

an enclosure comprising a ground electrode and a signal electrode,
the ground electrode comprising:
an interior member, including a first portion and a second portion, dividing the enclosure into a first space and a second space,
the interior member including one or more gaps connecting the first space to the second space, and
a gap, of the one or more gaps, separating the first portion from the second portion, and
the signal electrode comprising a first signal portion and a second signal portion,
the first signal portion extending from the first space through at least one of the one or more gaps into the second space, and
at least part of the first signal portion being proximate to the optical waveguide to induce a signal from the signal electrode to the optical waveguide, and
the second signal portion in the second space being connected to the first signal portion to reduce radio frequency loss associated with the electrode structure,
the second signal portion overlapping a portion of a length of the first portion and a portion of a length of the second portion, and
the signal electrode being enclosed, with regard to a surface of the substrate, by the enclosure in a plane perpendicular to the longitudinal axis.

17. The device of claim 16, where the enclosure includes a portion of the ground electrode attached to a surface of the substrate that is opposite a surface to which the signal electrode is proximate.

18. The device of claim 16, where the first signal portion is attached to or continuous with the second signal portion along the longitudinal axis.

19. The device of claim 16, where the second signal portion has a larger cross sectional area in a plane perpendicular to the longitudinal axis than the first signal portion to cause the second signal portion.

20. The device of claim 16, where
the second signal portion is rectangular in cross section,
the ground electrode comprises:
first ground portions formed upon or adjacent to the substrate,
the first ground portions being provided on opposite sides of the first signal portion,
the first portion is formed upon or attached to a first set of the first ground portions, and
the second portion is formed upon or attached to a second, different set of the first around portions.

* * * * *